(12) United States Patent
Blair

(10) Patent No.: US 10,212,037 B2
(45) Date of Patent: *Feb. 19, 2019

(54) DATA CENTER CONNECTIVITY SYSTEMS AND METHODS THROUGH PACKET-OPTICAL SWITCHES

(71) Applicant: Ciena Corporation, Hanover, MD (US)

(72) Inventor: Loudon T. Blair, Severna Park, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,366

(22) Filed: Oct. 19, 2017

(65) Prior Publication Data

US 2018/0041392 A1 Feb. 8, 2018

Related U.S. Application Data

(63) Continuation of application No. 14/867,679, filed on Sep. 28, 2015, now Pat. No. 9,819,546, which is a (Continued)

(51) Int. Cl.
*H04Q 11/00* (2006.01)
*H04L 12/24* (2006.01)
(Continued)

(52) U.S. Cl.
CPC ......... *H04L 41/0826* (2013.01); *H04B 10/27* (2013.01); *H04L 12/4641* (2013.01);
(Continued)

(58) Field of Classification Search
CPC ............... H04L 12/4641; H04L 49/351; H04L 41/0826; H04L 45/02; H04L 45/16;
(Continued)

(56) References Cited

U.S. PATENT DOCUMENTS 6,665,495 B1 12/2003 Miles et al.
7,245,582 B1 * 7/2007 Roberts ............... H04J 14/0227
370/217

(Continued)

FOREIGN PATENT DOCUMENTS

EP 1701495 A1 9/2006
EP 2410700 A1 1/2012
WO 2010106941 A1 9/2010

OTHER PUBLICATIONS

Guy Myoung Lee, Jun Kyun Choi; "Implementation and Applications of an Optical Hybrid Switching"; Optical Internet, 2007 and the 2007 32nd Australian Conference on Optical Fibre Technology—IEEE, Piscataway, NJ—Jun. 24, 2007. Relevant to claims 1-10.

(Continued)

*Primary Examiner* — Mohamed A Kamara
(74) *Attorney, Agent, or Firm* — Clements Bernard Walker PLLC; Christopher L. Bernard; Lawrence A. Baratta, Jr.

(57) ABSTRACT

A data center network includes a plurality of packet-optical switches each at a location in the data center network and each including a switch fabric comprising both a Layer 1 fabric and a packet fabric communicatively coupled to one or more line ports; wherein the plurality of packet-optical switches are communicatively coupled to one another in a topology to form data connectivity in the data center network, and wherein each of the plurality of packet-optical switches is configured to provide the data connectivity through the Layer 1 switch bypassing the packet fabric when the location does not require Layer 2 forwarding in the topology, and provide the data connectivity through the Layer 1 switch and using the packet fabric to provide the data service with multi-point connectivity when the location requires Layer 2 forwarding in the topology.

20 Claims, 29 Drawing Sheets

Related U.S. Application Data continuation-in-part of application No. 13/898,140, filed on May 20, 2013, now Pat. No. 9,148,223, which is a continuation-in-part of application No. 13/178,028, filed on Jul. 7, 2011, now Pat. No. 8,467,375.

(51) Int. Cl.

| | | |
|---|---|---|
| *H04L 12/705* | (2013.01) | |
| *H04B 10/27* | (2013.01) | |
| *H04L 12/46* | (2006.01) | |
| *H04L 12/931* | (2013.01) | |
| *H04L 12/761* | (2013.01) | |
| *H04L 12/751* | (2013.01) | |
| *H04J 3/16* | (2006.01) | |
| *H04J 14/02* | (2006.01) | |
| *H04L 12/721* | (2013.01) | |
| *H04L 12/715* | (2013.01) | |
| *H04L 12/723* | (2013.01) | |

(52) U.S. Cl.
CPC ............ *H04L 45/18* (2013.01); *H04L 49/351* (2013.01); *H04Q 11/0066* (2013.01); *H04Q 11/0067* (2013.01); *H04J 3/1658* (2013.01); *H04J 14/026* (2013.01); *H04J 14/0227* (2013.01); *H04J 14/0273* (2013.01); *H04J 2203/006* (2013.01); *H04J 2203/0053* (2013.01); *H04J 2203/0067* (2013.01); *H04L 45/02* (2013.01); *H04L 45/16* (2013.01); *H04L 45/50* (2013.01); *H04L 45/62* (2013.01); *H04L 45/64* (2013.01); *H04Q 2011/009* (2013.01); *H04Q 2011/0073* (2013.01); *H04Q 2011/0077* (2013.01); *H04Q 2011/0098* (2013.01)

(58) Field of Classification Search
CPC ......... H04L 45/18; H04L 45/50; H04L 45/62; H04L 45/64; H04Q 11/0062
See application file for complete search history.

(56) References Cited

U.S. PATENT DOCUMENTS

| | | | |
|---|---|---|---|
| 7,499,407 | B2 | 3/2009 | Holness et al. |
| 7,778,236 | B2 | 8/2010 | Yu |
| 8,849,115 | B2 | 9/2014 | Blair et al. |
| 9,819,546 | B2* | 11/2017 | Blair ..................... H04B 10/27 |
| 2004/0105459 | A1 | 6/2004 | Mannam |
| 2004/0151500 | A1 | 8/2004 | Misawa et al. |
| 2004/0156313 | A1 | 8/2004 | Hofmeister et al. |
| 2004/0170173 | A1 | 9/2004 | Pan et al. |
| 2005/0078685 | A1 | 4/2005 | Maclean et al. |
| 2007/0076616 | A1 | 4/2007 | Ngo et al. |
| 2008/0112400 | A1 | 5/2008 | Dunbar et al. |
| 2008/0112403 | A1 | 5/2008 | Larsen et al. |
| 2008/0124079 | A1 | 5/2008 | Zou |
| 2008/0291922 | A1 | 11/2008 | Sultan et al. |
| 2009/0161538 | A1 | 6/2009 | McGuire |
| 2009/0202239 | A1 | 8/2009 | Holness et al. |
| 2009/0268737 | A1 | 10/2009 | Giles et al. |
| 2010/0040368 | A1 | 2/2010 | Kotrla et al. |
| 2011/0135301 | A1 | 6/2011 | Myslinkski et al. |
| 2012/0014284 | A1 | 1/2012 | Ranganathan et al. |
| 2012/0106526 | A1* | 5/2012 | Yousefi ................. H04N 7/183 370/338 |
| 2012/0195319 | A1 | 8/2012 | Bragg et al. |
| 2012/0201535 | A1 | 8/2012 | Loprieno et al. |
| 2012/0269510 | A1 | 10/2012 | Hui et al. |

OTHER PUBLICATIONS

Philip Papadopoulos, Brian Dunne, Larry Smarr, Joseph Ford, Shaya Fainman; "Quartzite: A Campus-Scale Hybrid Networking Infrastructure"; Optical Fiber Communication/National Fiber Optical Engineers Conference, 2008. IEEE, Piscataway, NJ (Feb. 24, 2008). Relevant to claims 1-10.

* cited by examiner

DATA CENTER CONNECTIVITY SYSTEMS AND METHODS THROUGH PACKET-OPTICAL SWITCHES

CROSS-REFERENCE TO RELATED APPLICATION

This application is a continuation of co-pending U.S. patent application Ser. No. 14/867,679, filed Sep. 28, 2015, entitled "DATA CONNECTIVITY SYSTEMS AND METHODS THROUGH PACKET-OPTICAL SWITCHES," which is a continuation-in-part of U.S. patent application Ser. No. 13/898,140, filed May 20, 2013 (now U.S. Pat. No. 9,148,223 issued Sep. 29, 2015), entitled "ETHERNET PRIVATE LOCAL AREA NETWORK SYSTEMS AND METHODS," which is a continuation-in-part of U.S. patent application Ser. No. 13/178,028 filed Jul. 7, 2011 (now U.S. Pat. No. 8,467,375 issued Jun. 18, 2013), entitled "HYBRID PACKET-OPTICAL PRIVATE NETWORK SYSTEMS AND METHODS," the contents of which are incorporated in full by reference herein.

FIELD OF THE INVENTION

The present invention relates generally to networking systems and methods. More particularly, the present invention relates to data connectivity systems and methods delivered through Packet-Optical switches.

BACKGROUND OF THE INVENTION

Today, popular Carrier Ethernet services being defined by the Metro Ethernet Forum (MEF, online at metroethernetforum.org) include E-Line (for Point-to-point), E-Tree (for point-to-multi-point) and E-LAN (for multi-point) configurations. Depending on how bandwidth is allocated (i.e., dedicated or shared), these services may be defined as Ethernet Private Line/LAN (dedicated bandwidth) or Ethernet Virtual Private Line/LAN (shared bandwidth). These services are growing in popularity and will form the basis of future private and public network connectivity. For an Ethernet Virtual Private Line (EVPL) service, point-to-point bandwidth is assigned at Layer 2 through the use of packet tagging with oversubscription allowed. EVPL services are offered at a range of data rates from a few Mbps to Gbps and are typically implemented over native Ethernet or Multiprotocol Label Switching (MPLS)/Virtual Private Wire Services (VPWS) technologies. Layer 2 switching and transmission resources are shared with other services on the network. In the case of an Ethernet Private Line (EPL) service, bandwidth is dedicated at Layer 1 or 0 using Time Division Multiplexing (TDM), Wavelength Division Multiplexing (WDM), or fiber to partition the service from other services. By dedicating bandwidth in this way, oversubscription is not possible. Instead, the full rate of the connection is allocated to the customer, whether used or not. EPL services are typically defined for GbE or 10 GbE point-to-point connections. They are implemented over Wavelength Division Multiplexed (WDM), Synchronous Optical Network (SONET), Synchronous Digital Hierarchy (SDH), and increasingly over Optical Transport Network (OTN) technologies. Layer 2 bandwidth is not shared, but Layer 1 switching and transmission resources may be shared with other services on the network.

An Ethernet Virtual Private LAN (EVPLAN) service is similar to the EVPL except that it supports more than two user endpoints in a LAN configuration. Again, oversubscription is allowed. EVPLAN services may be supported over native Ethernet or MPLS/Virtual Private LAN Service (VPLS) technologies. Layer 2 switching and transmission resources are shared with other services on the network. Of the aforementioned service types, the virtual EVPL and EVPLAN services are popular because they offer the network operator the opportunity to oversubscribe bandwidth providing efficient use of network resources. While in many respects it is advantageous to multiplex many packet services across a single packet infrastructure (e.g., using IP, MPLS or native Ethernet technologies), many customers require dedicated and private connectivity services. Consequently, dedicated EPL services are very popular with large enterprise and wholesale carrier market segments that require dedicated bandwidth to build or supplement their own networks. This market segment has a need for Ethernet private LAN (EPLAN) connectivity in addition to EPL. Today a number of approaches exist for Ethernet private LANs, such as, for example, operating separate physical Ethernet networks over different physical network topologies. This requires that dedicated, separate Ethernet switches are used for each Ethernet private LAN service and connectivity to those switches is provided over EPL links. Unfortunately, this implementation is counter to the ongoing desire for convergence and consequently can be operationally challenging and expensive to deploy.

Alternatively, an approach may include operating separate Ethernet network instances using Virtual LAN (VLAN) or Service Instance Identifier (I-SID) differentiation on a common Ethernet infrastructure. This approach does not provide the full degree of partitioning provided in the previous example, but resources can be reserved in the Layer 2 network and dedicated to the Ethernet private line service. As an Ethernet bridged network, this approach is advantageous in that the service bandwidth demands scale linearly with the number of user endpoints (N). However, it is fundamentally a shared Layer 2 implementation. Therefore, to make sure that all sites offer the potential to act as an add/drop location (or a User-Network Interface (UNI)), all Ethernet bridges must participate in a single network topology (within which specific service instances are defined). The topology is organized using a spanning tree protocol (or, in the case of Shortest Path Bridging (SPB), a routing protocol) to define a loop-free forwarding topology. Then, for any given single service instance only a subset of the Ethernet bridges are actually used as UNIs, with the remainder acting as tandem forwarding devices. In many network locations (especially for large networks), the tandem traffic through a bridge can be large and can result in inefficient use of the packet fabric. In such situations, where Layer 2 forwarding decisions are not really required (e.g., degree-2 sites), it would be beneficial to bypass the packet fabric completely and so free up its switch capacity for adding new service instances (this is a similar problem to the much publicized 'IP router bypass' challenge). This situation becomes particularly evident when a large bandwidth user's VPN shares the same network as multiple small bandwidth VPNs. Unfortunately, the creation of a bypass link in an Ethernet network is not practical as it creates a new Layer 2 topology resulting in potential loops, thus requiring the re-definition of a new loop-free tree.

Yet further, an approach may include operating separate Ethernet network instances across separate MPLS or VPLS connections. This can be costly due to the higher cost per bit of IP/MPLS devices (relative to Ethernet switches). In addition to the transit issue described previously, MPLS/VPLS suffers from an $N^2$ bandwidth scaling inefficiency.

Each of the above is not ideal for the private bandwidth customer either due to cost or lack of trust in the shared approaches. Instead of using the above methods, many customers will choose to build their own private networks using multiple EPLs connecting their own switches together in a mesh configuration. This results in an $N^2$ connectivity inefficiency and the added operations complexity of operating their own WAN switches.

BRIEF SUMMARY OF THE INVENTION

In an exemplary embodiment, a method for providing a data service through a packet-optical switch in a network includes, subsequent to defining a loop-free forwarding topology for the data service in the network, if the packet-optical switch is a degree 2 site for the data service, providing the data service through the packet-optical switch at a Layer 1 protocol bypassing a partitioned packet fabric of the packet-optical switch; and if the packet-optical switch is a degree 3 or more site for the data service with multi-point connectivity, providing the data service through the packet-optical switch at the Layer 1 protocol and at a packet level using the partitioned packet fabric to provide the data service between the multi-point connectivity and to associated Layer 1 connections for each degree of the degree 3 or more site. The partitioned packet fabric in the packet-optical switch can utilize a software-defined virtual switch using Software Defined Networking (SDN) or a Virtual Switching Instance (VSI). The Layer 1 protocol can include Flexible Ethernet (FlexE) or Optical Transport Network (OTN). The data service can be one of Multiprotocol Label Switching (MPLS) switching, Internet Protocol (IP) routing, and Ethernet. The data service can utilize a Layer 1-enabled topology instead of a physical topology of the network for a loop-free topology.

In another exemplary embodiment, a packet-optical switch configured to provide a data service includes one or more line ports; a Layer 1 switching fabric; and a packet switching fabric; wherein subsequent to a determination of a loop-free forwarding topology for the data service in the network, if the packet-optical switch is a degree 2 site for the data service, the one or more line ports are configured to provide the data service at a Layer 1 protocol through the Layer 1 switching fabric bypassing the packet switching fabric; and wherein if the packet-optical switch is a degree 3 or more site for the data service with multi-point connectivity, the one or more line ports are configured to provide the data service at the Layer 1 protocol through the Layer 1 switching fabric and at a packet level using a partitioned packet fabric on the packet switching fabric to provide the data service between the multi-point connectivity and to associated Layer 1 connections for each degree of the degree 3 or more site. The partitioned packet fabric in the packet-optical switch can utilize a software-defined virtual switch using Software Defined Networking (SDN) or a Virtual Switching Instance (VSI). The Layer 1 protocol can include Flexible Ethernet (FlexE) or Optical Transport Network (OTN). The data service can be one of Multiprotocol Label Switching (MPLS) switching, Internet Protocol (IP) routing, and Ethernet. The data service can utilize a Layer 1-enabled topology instead of a physical topology of the network for a loop-free topology.

In a further exemplary embodiment, a network configured to provide a data service includes a plurality of packet-optical switches, wherein subsequent to a determination of a loop-free forwarding topology for the data service in the network, for each of the plurality of packet-optical switches which is a degree 2 site for the data service, the each of the plurality of packet-optical switches which is a degree 2 site provide the data service at a Layer 1 protocol through the Layer 1 switching fabric bypassing the packet switching fabric; and wherein for each of the plurality of packet-optical switches which is a degree 3 or more site for the data service with multi-point connectivity, each of the plurality of packet-optical switches which is a degree 3 or more to provide the data service at the Layer 1 protocol through a Layer 1 switching fabric and at a packet level using a partitioned packet fabric on the packet switching fabric to provide the data service between the multi-point connectivity and to associated Layer 1 connections for each degree of the degree 3 or more site. The partitioned packet fabric in the packet-optical switch can utilize one of a software-defined virtual switch using Software Defined Networking (SDN) and a Virtual Switching Instance (VSI). The Layer 1 protocol can include one of Flexible Ethernet (FlexE) and Optical Transport Network (OTN). The data service can be one or more of Multiprotocol Label Switching (MPLS) switching, Internet Protocol (IP) routing, and Ethernet.

In an exemplary embodiment, a network includes a plurality of hybrid packet-optical switches interconnected therebetween; an Ethernet private local area network (EPLAN) over the plurality of hybrid packet-optical switches, the Ethernet private LAN including a multi-point configuration; wherein the EPLAN is formed primarily over a Layer 1 infrastructure forming dedicated Ethernet Private Lines over the plurality of hybrid packet-optical switches connected to dedicated virtual switching instances in each of the plurality of hybrid packet-optical switches in the EPLAN comprising three or more ports therein. Each port in the EPLAN can include a Layer 1 port configured as one of an Ethernet port and an Optical Transport Network (OTN) framed Ethernet port. The EPLAN can include a plurality of tiers separating network resources. The plurality of tiers can include a private physical network topology, a private digital network topology, and a port partitioned Ethernet LAN. Each of the plurality of hybrid packet-optical switches can include: a packet switch with the dedicated virtual switching instances provided therein; and an Optical Transport Network (OTN) switch communicatively coupled to the packet switch. The packet switch can include flow interface options, logical interface options, and physical ports communicatively coupled to the OTN switch; and wherein the OTN switch provides add/drop at an Optical channel Data Unit (ODU) level to the packet switch via dedicated low-order ODUs, multiplexed Optical channel Transport Units (OTUs) in high-order ODUs, and private through switched ODUs.

The network can further include a management system communicatively coupled to the plurality of hybrid packet-optical switches, wherein the management system is configured to receive a set of ports and provision the EPLAN via Software Defined Networking. The management system can be partitioned such that a service provider associated with the plurality of hybrid packet-optical switches views and monitors Layer 1 and Layer 2 connectivity and an enterprise associated with the EPLAN monitors only Layer 2 connectivity. The management system can be configured to: define a physical network topology; define user service endpoints; define a shortest path tree between the plurality of hybrid packet-optical switches; define the dedicated virtual switching instances at each of the plurality of hybrid packet-optical switches in the EPLAN comprising the three or more ports therein; and create the Layer 1 infrastructure between the dedicated virtual switching instances. The network can further include a Software Defined Networking agent running on the plurality of hybrid packet-optical switches and communicatively coupled to a Software Defined Networking controller. Responsive to a fault in the Layer 1 infrastructure, Layer 1 protection can be initiated to provide resiliency in the EPLAN. Responsive to a fault in the dedicated virtual switching instances, a shared backup protection resource can be switched to via the Layer 1 infrastructure.

In another exemplary embodiment, a network element includes a plurality of ports; Layer 1 switching; Layer 2 switching; a communications interface communicatively coupling the plurality of ports, the Layer 1 switching, and the Layer 2 switching therebetween; and an Ethernet private local area network (EPLAN) over at least one of the plurality of ports; wherein, in the EPLAN, the EPLAN solely interfaces the Layer 1 switching if the network element is an endpoint or if the network element comprises two ports in the EPLAN, and the EPLAN interfaces both the Layer 1 switching and the Layer 2 switching if the network element comprises at least three ports in the EPLAN. Each port in the EPLAN can include a Layer 1 port configured as one of an Ethernet port and an Optical Transport Network (OTN) framed Ethernet port. The EPLAN can include a plurality of tiers separating network resources and wherein the plurality of tiers can include a private physical network topology, a private digital network topology, and a port partitioned Ethernet LAN. The Layer 2 switching can include flow interface options, logical interface options, and physical ports communicatively coupled to the Layer 1 switching; and wherein the Layer 1 switching provides add/drop at an Optical channel Data Unit (ODU) level to the packet switch via dedicated low-order ODUs, multiplexed Optical channel Transport Units (OTUs) in high-order ODUs, and private through switched ODUs.

The network element can further include a controller communicatively coupled to a management system, wherein the management system is configured to receive a set of ports and provision the EPLAN via Software Defined Networking. The management system can be partitioned such that a service provider associated with the network element views and monitors Layer 1 and Layer 2 connectivity and an enterprise associated with the EPLAN monitors only Layer 2 connectivity. The network element can further include a Software Defined Networking agent running on the controller and communicatively coupled to a Software Defined Networking controller.

In yet another exemplary embodiment, a method implemented by a Software Defined Networking controller includes receiving a plurality of ports for an Ethernet private Local Area Network (EPLAN); defining a physical network topology; defining user service endpoints; defining a shortest path tree between a plurality of hybrid packet-optical switches; defining dedicated virtual switching instances at each of a plurality of hybrid packet-optical switches in the EPLAN comprising the three or more ports therein; and creating a Layer 1 infrastructure between the dedicated virtual switching instances.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

Figure 1:
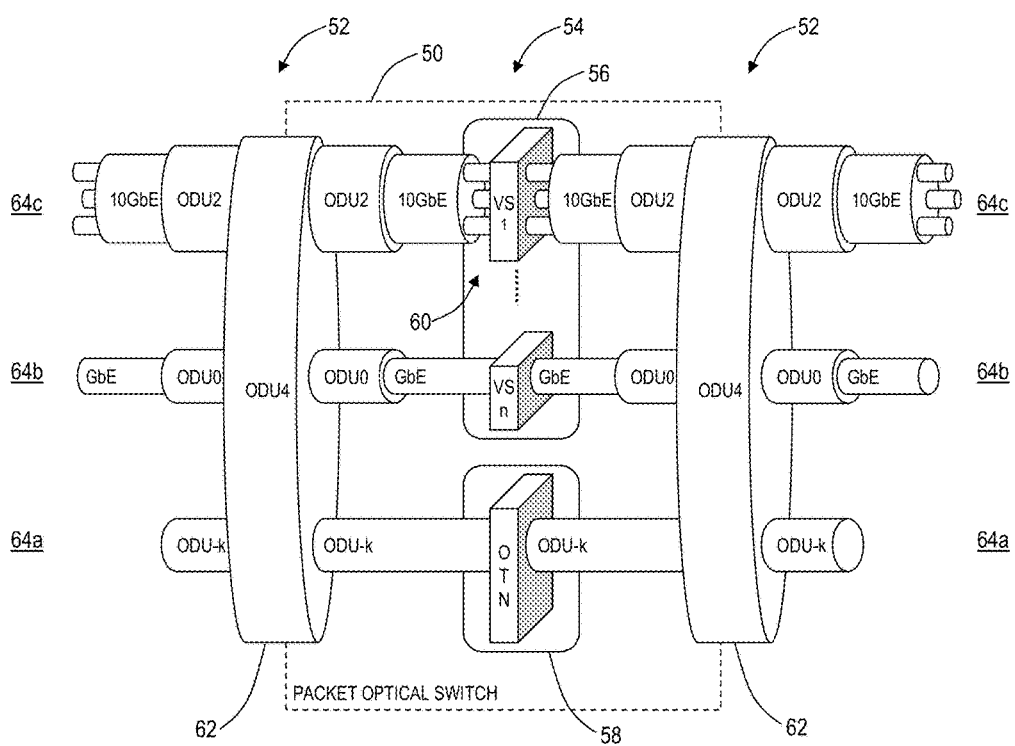
FIG. 1 is a conceptual diagram of a hybrid packet-optical switch for a private and dedicated multi-point EPLAN.

In various exemplary embodiments, the present disclosure describes hybrid packet-optical private network systems and methods for a private and dedicated multipoint Ethernet Private Local Area Network (EPLAN). The network systems and methods include a Layer 1 (e.g., optical, time division multiplexing, etc.) infrastructure service with the inclusion of reserved, dedicated packet switch capacity upon which clients can build their personal, private packet networks. The EPLAN used in the systems and methods described herein is different from other E-LAN implementations that are typically built using packet technologies only, such as MPLS or Ethernet VLANs. In the systems and methods described herein, packet networking methods are not used to partition the isolated LAN connectivity. Instead, in an exemplary embodiment, dedicated Ethernet Private Lines (EPLs) are defined between dedicated virtual switching instances (VSIs) that are defined, as necessary, within larger packet-optical switches. Each VSI is partitioned from the remainder of its packet switch fabric as a dedicated, private resource for a specific EPLAN. In another exemplary embodiment, a Software-Defined virtual switch, defined by Software Defined Networking (SDN) is used within a single physical packet switch to perform the partitioning in a similar manner as the VSI. A packet network is then built by the customer on top of the private EPLAN bandwidth and operated by the customer as an isolated, private network with no influence by other carrier's network resources. The Ethernet Private LAN (EPLAN) service is similar to the EPL in that bandwidth is dedicated to the service and oversubscription is not allowed. However, it is different from the EPL in that packet switching must be provided to enable LAN connectivity between greater than two user endpoints.

With EPLAN, any interface to (i) a client or (ii) another carrier is a Layer 1 "port." The port may be configured as an Ethernet PHY such as GbE or 10 GbE or as an OTN-framed Ethernet signal such as ODU0 or ODU2 (Optical channel Data Unit level k, k=0, 1, 2, 3, . . . ), for example. Because it is a port-based approach, the EPLAN is compatible with the operations practice of carrier transport teams and not necessarily the data teams who would normally operate LAN connectivity services. While some Layer 2 network functionality is involved, it is only associated with the unique EPLAN service and the customer's overlay network. Because of this independence from all other traffic on the carrier's network, the data operations or planning teams are likely to be a client of this service. This solution provides an Ethernet LAN service offering on a packet-optical transport platform that is differentiated from those offered by pure packet switch and router platforms. It provides basic private transport functionality that packet-only platforms cannot support. The EPLAN takes advantage of ability to switch Layer 1 OTN and Layer 2 Ethernet within the same packet-optical switching network element.

Referring to FIG. 1, in an exemplary embodiment, a conceptual diagram illustrates a hybrid packet-optical switch 50 for a private and dedicated multi-point EPLAN. The hybrid packet-optical switch 50 accommodates packet and circuit connectivity and switching in support of shared and dedicated services. Conceptually, the hybrid packet-optical switch 50 includes ingress/egress 52 and switching 54. Furthermore, the switching 54 may include a packet switching fabric 56 and a circuit switching fabric 58. The packet switching fabric 56 may be partitioned into multiple separate virtual switches 60 (denoted in FIG. 1 as $VS_1 \ldots VS_n$) each dedicated to a network instance. In the exemplary embodiment of FIG. 1, the hybrid packet-optical switch 50 is illustrated with a single Optical channel Data Unit level 4 (ODU4) 62 as ingress/egress to the hybrid packet-optical switch 50 with switching performed thereon. Specifically, the ODU4 62 provides transport for a plurality of connections 64a, 64b, 64c with EPLANs contained therein. The hybrid packet-optical switch 50 supports private switching at both Layer 1 and Layer 2. As described herein, the Layer 1 protocol, for example, is OTN and the Layer 2 protocol, or data service is Ethernet. The present disclosure contemplates other Layer 1 protocols such as Flexible Ethernet (also referred to as FlexE, Flex Ethernet, etc.), Synchronous Optical Network (SONET), Synchronous Digital Hierarchy (SDH), and the like. The present disclosure also contemplates other data services besides Ethernet such as Multiprotocol Label Switching (MPLS) switching, Internet Protocol (IP) routing.

With respect to the connection 64a, at Layer 1, when Layer 2 forwarding is not required, private switching is performed using the circuit switching fabric 58 (e.g., an OTN switch fabric with ODU-k granularity). For example, the connection 64a may be part of the ODU4 62 as an ODU-k (k=0, 1, 2, or 3) providing private optical network connectivity but bypassing packet switching at the switch 50. With respect to the connections 64b, 64c, at Layer 2, the packet switching fabric 56 is partitioned into multiple virtual switching instances (VSI) that operate as independent Ethernet switching entities, i.e., the multiple separate virtual switches 60. For the EPLAN, private Layer 2 switching is achieved by dedicating a VSI to each EPLAN service. The capacity of the reserved VSI is defined as part of the private service offering (e.g., for a GbE service with three connecting ports, the VSI may be sized to switch 3 Gbps). Other VSI's may be defined within the same switching system to support other EPLAN services and/or a single VSI may be reserved to support shared virtual private EVPLAN services, also. The connection 64b may include packet Ethernet services over a dedicated packet network, i.e., a GbE in an ODU0 in the ODU4 62. Here, the virtual switch 60 performs dedicated Ethernet switching for the connection 64b. The connection 64c may include multiple Ethernet services over a shared packet network, i.e., multiple connections in a 10 GbE in an ODU2 in the ODU4 62. Here, the virtual switch 60 performs shared Ethernet switching. Of note, private transmission is achieved by wrapping a GbE or 10 GbE PHY in an ODU0, ODU2 or ODUflex container and multiplexing into, for example, the ODU4 62 (100 Gbps) in the same way that an EPL would be carried. It is important to note that to achieve the hybrid Layer 1 and Layer 2 functionality required to support the EPLAN, a hybrid switch interface on the hybrid packet-optical switch 50 must provide access to both the circuit switching fabric 58 and the packet switching fabric 56.

Again, in addition to using VSIs, the virtual switches 60 can be realized as Software-Defined virtual switches, defined by SDN. Here, an SDN controller or the like is configured to define a single physical packet switch in the packet switching fabric 56. In SDN, the Software-Defined virtual switch is partitioned, providing similar functionality as the VSI. Also, the data service described herein is Ethernet (e.g., EPLAN, EVPLAN, etc.). Again, those of ordinary skill in the art will recognize the hybrid packet-optical switch 50 can support other data services including Multiprotocol Label Switching (MPLS) switching, Internet Protocol (IP) routing, and the like. Specifically, MPLS and/or IP can be used with the Layer 1 protocol to support bypass connectivity through the hybrid packet-optical switch 50.

In another exemplary embodiment, the Layer 1 protocol can be FlexE instead of OTN. FlexE is based on Ethernet constructs, e.g., 64*b*/66*b* encoding, recognizing the primary client being transported is Ethernet. The current scope of FlexE is described in Implementation Agreement IA #OIF-FLEXE-01.0 "Flex Ethernet Implementation Agreement—Draft 1.1" (July 2015). FlexE provides a generic mechanism for supporting a variety of Ethernet Media Access Control (MAC) rates that may or may not correspond to any existing Ethernet PHY rate. This includes MAC rates that are both greater than (through bonding) and less than (through sub-rate and channelization) the Ethernet PHY (Physical Layer) rates used to carry FlexE. This can be viewed as a generalization of the Multi-Link Gearbox implementation agreements, removing the restrictions on the number of bonded PHYs (MLG2.0, for example, supports one or two 100 GBASE-R PHYs) and the constraint that the client signals correspond to Ethernet rates (MLG2.0 supports only 10 G and 40 G clients). The Multi-Link Gearbox implementation agreements are described in IA # OIF-MLG-01.0 "Multi-link Gearbox Implementation Agreement" (May 2012) and IA # OIF-MLG-02.0 "Multi-link Gearbox Implementation Agreement" (April 2013), the contents of each are incorporated by reference.

Figure 2:
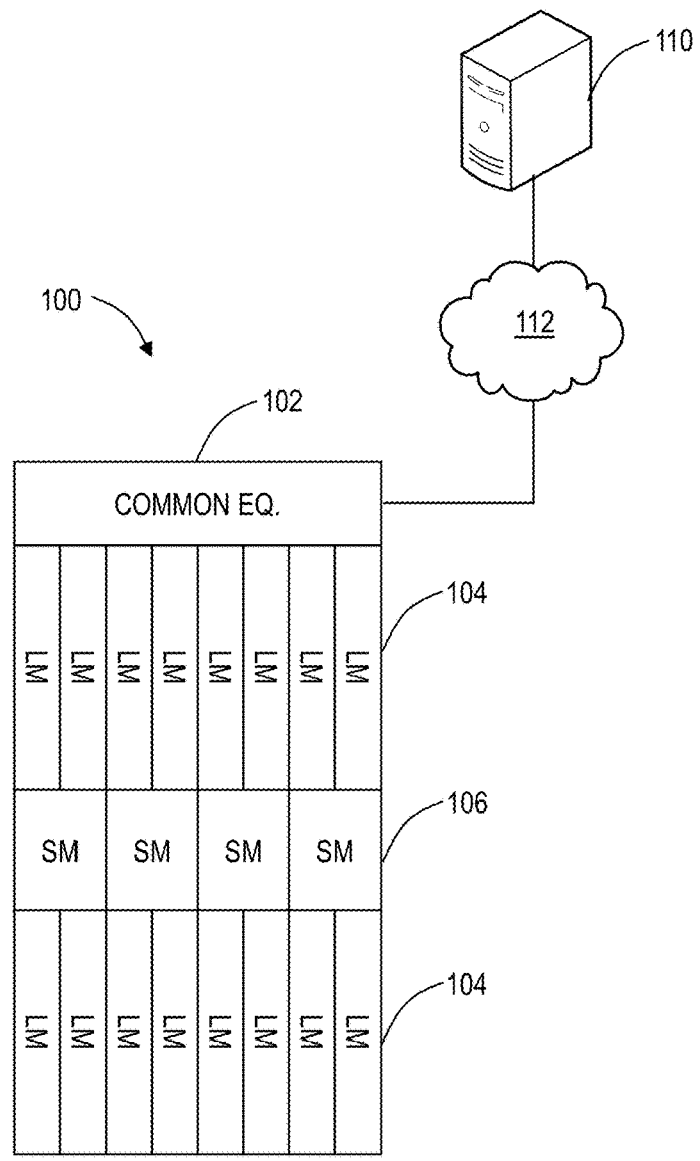
FIG. 2 is a block diagram of an exemplary optical network element for an exemplary implementation of the hybrid packet-optical switch of FIG. 1.

Referring to FIG. 2, in an exemplary embodiment, an exemplary optical network element 100 is illustrated for the hybrid packet-optical switch 50 of FIG. 1. In an exemplary embodiment, the optical network element 100 is a network element (NE) that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 100 may include a SONET add/drop multiplexer (ADM), an SDH ADM, an OTN ADM, a multi-service provisioning platform (MSPP), a digital cross-connect (DCS), etc. Generally, the optical network element 100 includes common equipment 102, line modules (LM) 104, and switch modules (SM) 106. The common equipment 102 may include power; a control module; operations, administration, maintenance, and provisioning (OAM&P) access; and the like. For example, the common equipment 102 may connect to a management system 110 through a data communication network 112. The management system 110 may include a network management system (NMS), element management system (EMS), or the like. Additionally, the common equipment 102 may include a control plane processor configured to operate a control plane and the systems and methods described herein. Exemplary control planes may include Automatically Switched Optical Network (ASON) (G.8080/Y.1304, etc.), Automatic Switched Transport Network (ASTN), Generalized Multiprotocol Label Switching (GM-PLS), Optical Signaling and Routing Protocol (OSRP), MPLS and the like that use control protocols based on technologies such as OSPF, ISIS, RSVP, LMP, PNNI, etc.

The line modules 104 may be communicatively coupled to the switch modules 106, such as through a backplane, midplane, or the like. The line modules 104 are configured to provide ingress and egress to the switch modules 106 and are configured to provide interfaces for the OTN and Ethernet services described herein. In an exemplary embodiment, the line modules 104 may form ingress and egress switches with the switch modules 106 as center stage switches for a three-stage switch, e.g., a three-stage Clos switch. The line modules 104 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical network elements 100, NEs, end clients, and the like. From a logical perspective, the line modules 104 provide ingress and egress ports to the optical network elements 100, and each line module 104 may include one or more physical ports.

The switch modules 106 are configured to switch services between the line modules 104. For example, the switch modules 106 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity including FlexE groups, clients, etc.; Digital Signal n (DSn) granularity such as DS0, DS1, DS3, etc.; Internet Protocol (IP); MPLS; and the like. Specifically, the switch modules 106 may include both Time Division Multiplexed (TDM) and packet switching engines. The switch modules 106 may include redundancy as well, such as 1:1, 1:N, etc. Those of ordinary skill in the art will recognize the optical network element 100 may include other components which are omitted for simplicity, and that the systems and methods described herein are contemplated for use with a plurality of different network elements with the optical network element 100 presented as an exemplary type of network element. For example, in another exemplary embodiment, the optical network element 100 may not include the switch modules 106, but rather have the corresponding functionality in the line modules 104 in a distributed fashion. For the optical network element 100, other architectures providing ingress, egress, and switching therebetween are also contemplated for the systems and methods described herein.

Figure 3:
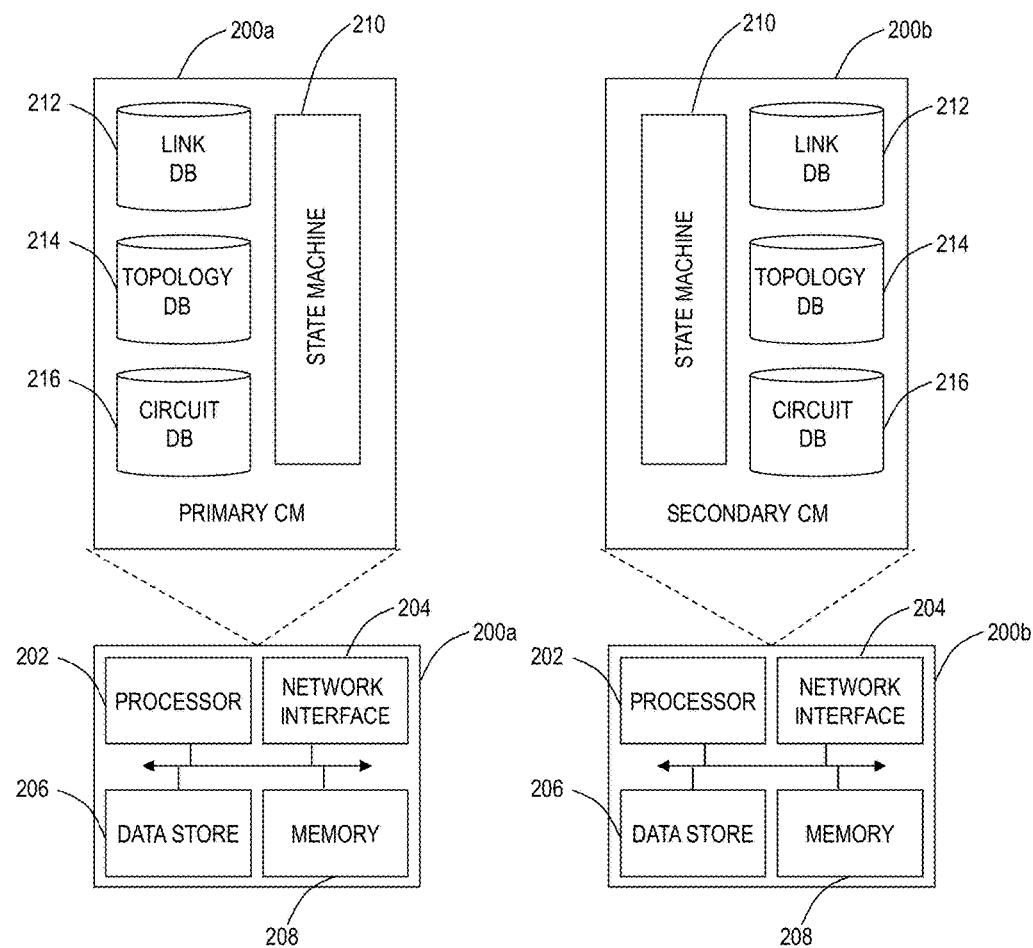
FIG. 3 is a block diagram of redundant control modules (CMs) for the optical network element of FIG. 2 to provide control plane processing.

Referring to FIG. 3, in an exemplary embodiment, redundant control modules (CMs) 200*a*, 200*b* for the optical network element 100 are illustrated to provide control plane processing. For example, the control plane can include OSRP, ASON, GMPLS, MPLS, and the like as described herein. The CMs 200*a*, 200*b* may be part of the common equipment, such as common equipment 102 in the optical network element 100 of FIG. 2. The CMs 200*a*, 200*b* may include a processor 202 which is a hardware device for executing software instructions such as operating the control plane. The processor 202 may be any custom made or commercially available processor, a central processing unit (CPU), an auxiliary processor among several processors associated with the CMs 200a, 200b, a semiconductor-based microprocessor (in the form of a microchip or chip set), or generally any device for executing software instructions. When the CM 200a, 200b is in operation, the processor 202 is configured to execute software stored within the memory, to communicate data to and from memory, and to generally control operations of the CM 200a, 200b pursuant to the software instructions.

The CMs 200a, 200b may also include a network interface 204, a data store 206, memory 208, and the like, all of which are communicatively coupled therebetween and with the processor 202. The network interface 204 may be used to enable the CMs 200a, 200b to communicate on a network, such as to communicate control plane information to other CMs or to the management system 110. The network interface 204 may include, for example, an Ethernet card (e.g., 10BaseT, Fast Ethernet, Gigabit Ethernet) or a wireless local area network (WLAN) card (e.g., 802.11a/b/g). The network interface 204 may include address, control, and/or data connections to enable appropriate communications on the network. The data store 206 may be used to store data, such as control plane information received from network elements 100 or other CMs, provisioning data, OAM&P data, etc. The data store 206 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 206 may incorporate electronic, magnetic, optical, and/or other types of storage media. The memory 208 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208 may incorporate electronic, magnetic, optical, and/or other types of storage media. Note that the memory 208 may have a distributed architecture, where various components are situated remotely from one another but may be accessed by the processor 202.

From a logical perspective, each of the CMs 200a, 200b may include a state machine 210, a link database (DB) 212, a topology DB 214, and a circuit DB 216. The CMs 200a, 200b are responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Hanover, Md. Which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween. The control plane may be centralized, distributed, or a combination thereof.

The CMs 200a, 200b may be configured in a redundant 1+1, 1:1, etc. configuration. The state machine 210 is configured to implement the behaviors described herein with regard to OTN auto carving and policy enforcement. The DBs 212, 214, 216 may be stored in the memory 208 and/or the data store 206. The link DB 212 includes updated information related to each link in a network including. The topology DB 214 includes updated information related to the network topology, and the circuit DB 216 includes a listing of terminating circuits and transiting circuits at an NE where the CMs 200a, 200b are located. The CMs 200a, 200b may utilize control plane mechanisms to maintain the DBs 212, 214, 216. For example, HELLO messages can be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. The state machine 210 and the DBs 212, 214, 216 may be configured to provide automated end-to-end provisioning. For example, a route for a connection may be computed from originating node to terminating node and optimized using Dijkstra's Algorithm, i.e., shortest path from source to a destination based on the least administrative cost or weight, subject to a set of user-defined constraints.

Further, the CMs 200a, 200b are configured to communicate to other CMs 200a, 200b in other nodes on the network. This communication may be either in-band or out-of-band. For SONET networks and similarly for SDH networks, the CMs 200a, 200b may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e., each of GCC1 and GCC2 includes two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 4A:
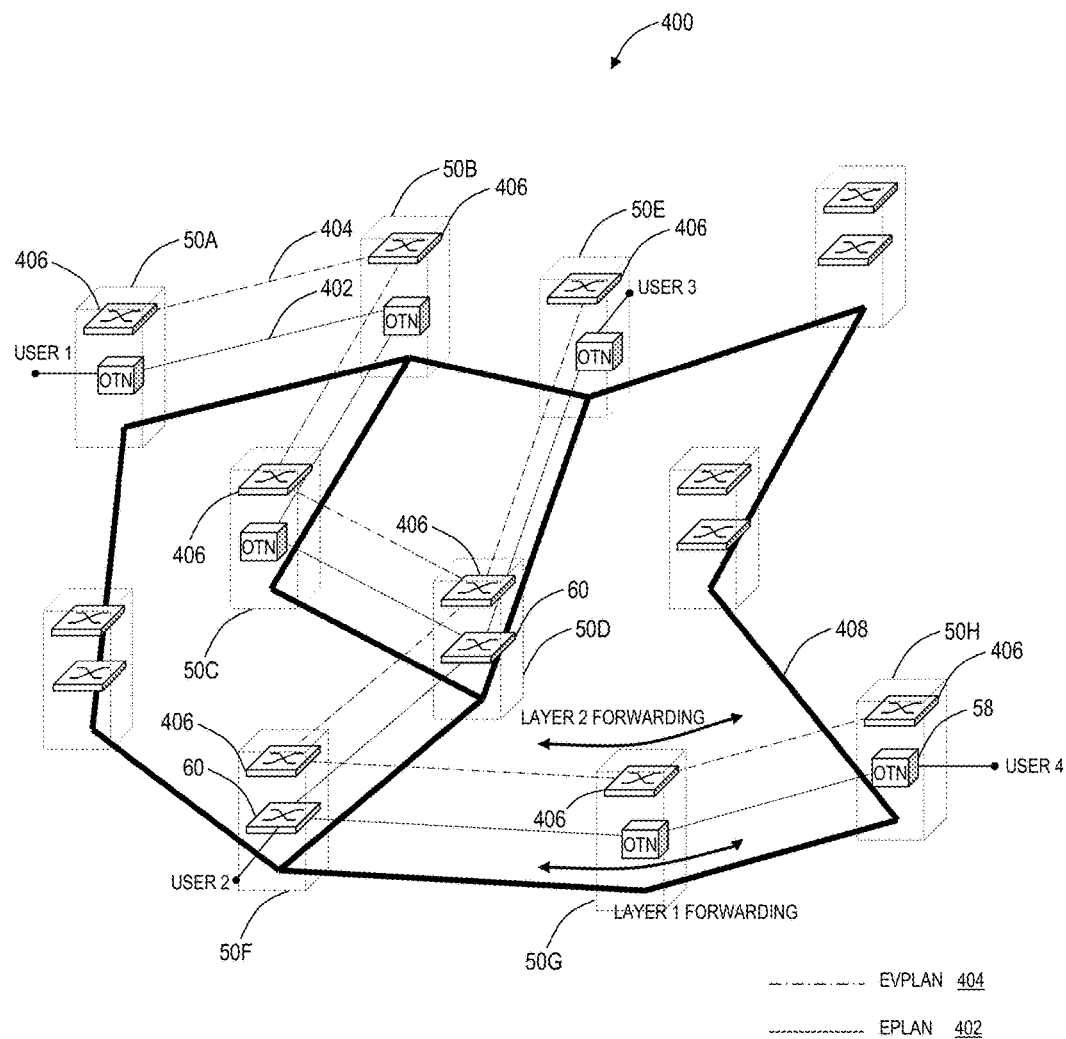
FIGS. 4A and 4B are diagrams of an exemplary network with a plurality of interconnected hybrid packet-optical switches showing an EPLAN compared to a conventional EVPLAN.
Figure 4B:
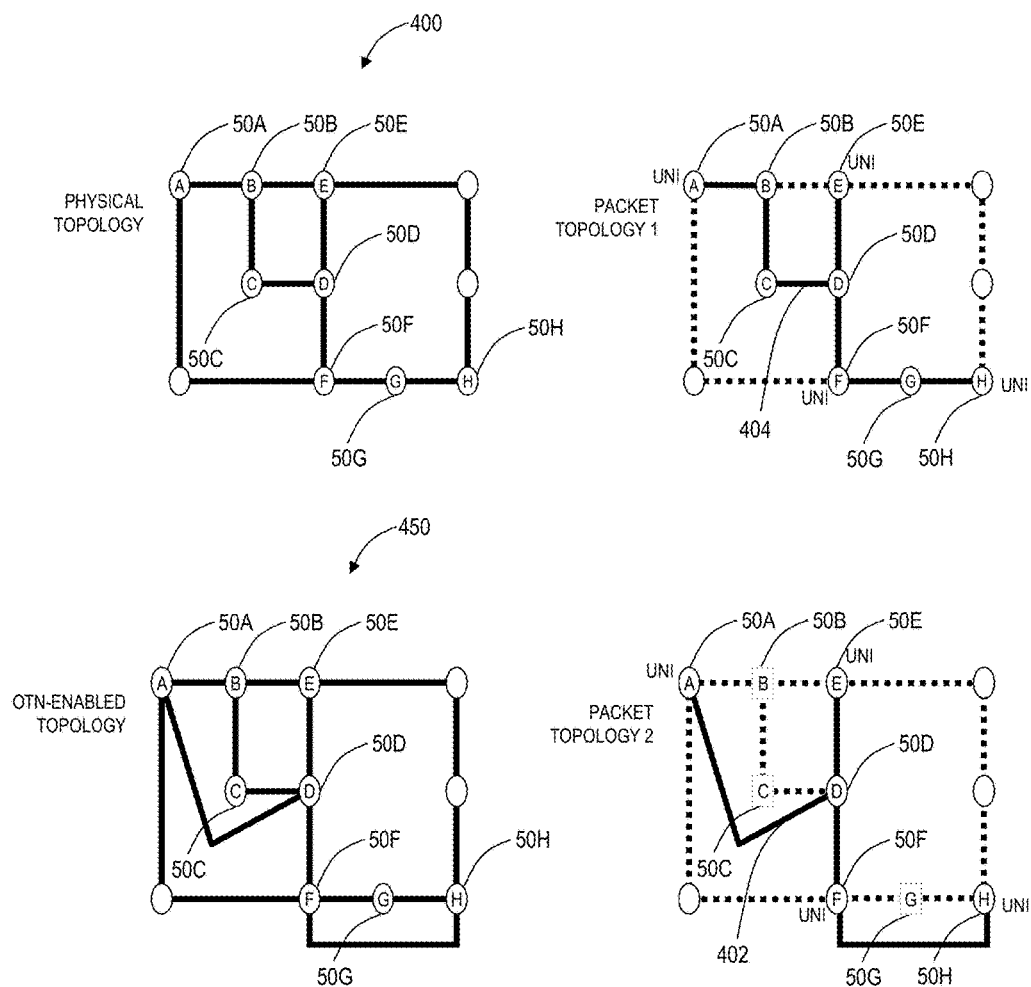

Referring to FIGS. 4A and 4B, a network 400 illustrates a plurality of interconnected hybrid packet-optical switches 50A-50H showing an EPLAN 402 compared to a conventional EVPLAN 404. FIG. 4A illustrates the network 400, and FIG. 4B illustrates a topology view of the EPLAN 402 and the EVPLAN 404. Each of the hybrid packet-optical switches 50A-50H includes a circuit switching fabric 58 (i.e., an OTN switch fabric) and a packet switching fabric through virtual switches 60 as described in FIG. 1 and a Layer 2 switch 406. Further, the switches 50 are interconnected physically via links 408 which may include fibers carrying optical wavelengths of OTN traffic, for example. The network 400 illustrates a network perspective of how the EPLAN 402 (defined using a hybrid combination of Layer 1 and Layer 2 switches, i.e., the fabric 58 and the virtual switch 60) compares against a more traditional EVPLAN 404 (defined using only the Layer 2 switches 406). For the purpose of this exemplary illustration, the topology of both the EPLAN 402 and the EVPLAN 404 have already been organized (e.g., using spanning tree) to define a loop-free forwarding topology. Then, for any given single service instance only a subset of the Ethernet bridges are actually used as user interfaces, with the remainder acting as tandem forwarding devices.

The EVPLAN 404 uses the Layer 2 switches 406 at all locations and defines E-LAN connectivity through the use of traditional packet partitioning methods. Consequently, service data is forwarded through the Layer 2 switch 406 which is a shared Layer 2 switching fabric at every location. In many network switches (especially for large networks), the tandem traffic through an Ethernet bridge can be large and can result in inefficient use of the packet fabric. In such situations, where Layer 2 forwarding decisions are not really required (e.g., in the exemplary network 400 at the hybrid packet-optical switches 50A, 50B, 50C, 50E, 50G, and 50H), it can be beneficial to bypass the packet fabric completely. In accordance with the hybrid packet-optical private network systems and methods, the EPLAN 402 uses only Layer 2 switch resources (e.g., via the virtual switch 60) at locations where multi-point routing decisions are required. In the exemplary network 400, only two reserved virtual switching instances are required with the virtual switch 60, i.e., at the hybrid packet-optical switches 50F and 50D, for the EPLAN 402. At the hybrid packet-optical switch 50F, there is a user interface 410 for user 2 as well as an east-west connection between to the switch 50D and to the switch 50G, thus the switch 50F is required to perform multi-point routing. At the hybrid packet-optical switch 50D, the switch 50D is a degree-3 switch node thus also requiring multi-point routing. In accordance with the hybrid packet-optical private network systems and methods, at all other locations for the EPLAN 402, services such as a private GbE or 10 GbE service are port switched using the OTN switching fabric 58.

In an exemplary embodiment, the network 400 can be a server interconnection network where compute servers are located at each of the endpoints coupled to the hybrid packet-optical switches 50A, 50B, 50C, 50E, 50G, and 50H (i.e., a private server interconnection network). So the packet switching or Ethernet service termination/switching can actually be on a Virtual Machine (VM) hosted on a server. Also, MPLS and/or IP can be used in the server interconnection network instead of just Ethernet switching, e.g., to describe a distributed data center underlay implementation (e.g., using Hierarchical SDN (HSDN) or IP VPNs).

FIG. 4B illustrates a topology view highlighting the EPLAN 402 and the EVPLAN 404. In the example of FIGS. 4A and 4B, there is assumed to be multiple services with user-network interfaces (UNIs) scattered across all locations. With a single Ethernet switch per switch 50, a routing method such as ISIS in Shortest Path Bridging (SPB) builds a shortest path VLAN between switch locations. For illustration purposes, the EPLAN 402 and the EVPLAN 404 are illustrated with one particular service including UNIs at the switches 50A, 50E, 50F, 50H for a particular Service Instance Identifier (I-SID). For both the EPLAN 402 and the EVPLAN 404, the switches 50B, 50C, 50D, 50G are only transit bridging locations (for this particular service instance). As illustrated in FIG. 4A, both the EPLAN 402 and the EVPLAN 404 utilize the physical topology of the network 400. With the EVPLAN 404, the network 400 includes Layer 2 switching at the intermediate switches 50B, 50C, 50D, 50G. At the transit bridging locations of switches 50B, 50C, 50D, 50G, the network 400 is good for statistical multiplexing of many low bandwidth granularity services, but the network makes inefficient use of transit packet fabrics when one service is high bandwidth granularity. That is, the network 400 works for the EVPLAN 404 at the transit bridging locations of switches 50B, 50C, 50D, 50G, but this is not private as it is based on the shared use of resources.

As described herein, the EPLAN 402 uses an OTN switch in the transit bridging locations of switches 50B, 50C, 50D, 50G to bypass Ethernet switches at these transit locations. In particular, the EPLAN 402 sees an OTN-enabled topology 450 in lieu of the physical topology of the network 400. This OTN-enabled topology 450 allows for the EPLAN to avoid the switches 50B, 50C, 50G from a Layer 2 perspective effectively. This minimizes the number of Layer 2 switching locations in the LAN to the minimum number of bridges required to support service through bypassing the packet switches in the switches 50B, 50C, 50G. Further, this removes transit bandwidth from packet switches in the switches 50B, 50C, 50G freeing up Layer 2 resources at those locations for new services. Note, the transit/bridging function still required in the switch 50D for the EPLAN 402. In particular, the switches 50D, 5° F. include a partitioned packet switch as multiple virtual switches. The Ethernet topology is built separately per virtual switch connected by ODU subnetwork connections.

Figure 5:
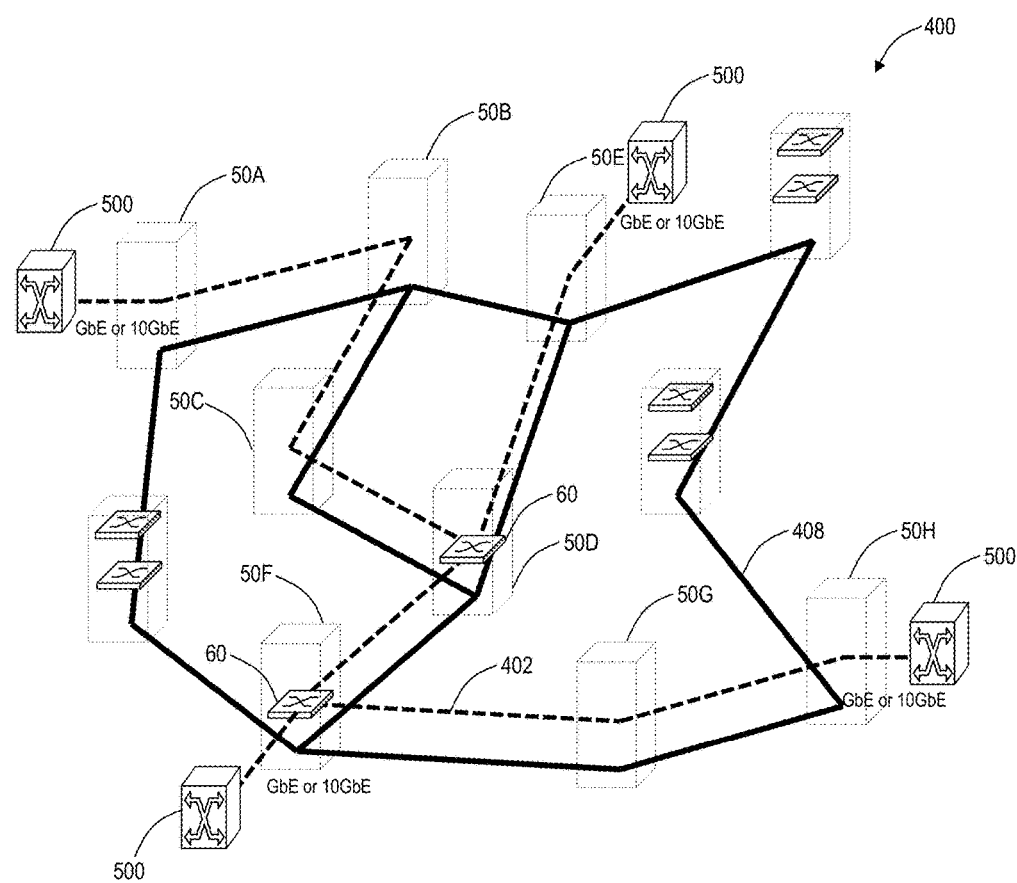
FIG. 5 is a diagram of the network of FIG. 4 showing the EPLAN from the perspective of an end customer associated with the EPLAN.

Referring to FIG. 5, in an exemplary embodiment, the network 400 illustrates the EPLAN 402 from the perspective of an end customer associated with the EPLAN 402. In particular, the end customer connects their own private switches 500 to the EPLAN 402 using a handoff from the hybrid packet-optical switches 50. For example, the private switches 500 may include a GbE or 10 GbE connection from the hybrid packet-optical switches 50A, 50E, 50F, 50H as illustrated in the exemplary network 400. The Ethernet ports are then mapped to OTN containers (e.g., ODU0 or ODU2) at the hybrid packet-optical switches 50A, 50E, 50F, 50H, which are then transmitted to hybrid packet-optical switches 50D, 50F. At the switches 50D, 50F, the GbE or 10 GbE ports are associated with a pair of dedicated VSIs in the switches 60. To the end customer, the VSIs in the switches 60 appear as if they are part of a private six-node network (six nodes=the switches 60 at the switches 50D, 5° F. and the private switches 500 communicatively coupled to the switches 50A, 50E, 50F, 50H), and the VSIs in the switches 60 may be managed as if they were the end customer's own switching devices. Now that private partitioned connectivity is achieved, the end customer can set up any standard Ethernet networking technique as it will operate on the combination of Ethernet links and the virtual switches 60 as over any Ethernet switched network. Furthermore, a service provider of the network 400 may make usage and performance data available to the end-user to aid in the management of the private network.

Advantageously because the EPLAN 402 uses the minimum number of Layer 2 switches (private VSIs) and ports necessary to enable private network connectivity, the network 400 becomes straightforward to operate. Consequently, the EPLAN 402 Layer 2 forwarding tables will be small (especially relative to the scale of the service provider's network) resulting in a private network that will be simple to operate and manage. In this 'small network' context, for example, Rapid Spanning Tree Protocol (RSTP), which has been found to degrade in performance in large networks, re-emerges as a viable resiliency option for the end-user. The service provider may view the EPLAN 402 as a set of reserved packet switch resources dedicated to a single customer and connected together with Ethernet Private Lines. Data that is carried within the EPLAN 402 is invisible to the service provider, both within the transport connections and across the private virtual switches 60. At no time does the service provider gain access to or touch the customer's private data. In this respect, the service provider's network is completely transparent to the EPLAN 402 end customer.

To the service provider, the EPLAN 402 is a Layer 1 port-based service with some Layer 2 service characteristics associated with the private virtual switching capabilities of the switch 60. While the service provider's service level agreement need not be as complex as a Layer 2 virtual packet service, it will still be necessary for the service provider and customer to agree upon performance guarantees. Because the EPLAN 402 is fully dedicated to the end-user, it is possible for the service provider to offer the customer a maximum Committed Information Rate (CIR=1) on each port (i.e., there is no opportunity for any other general network user to interfere with the EPLAN 402 customer's traffic). However, because the service provider does not manage the bandwidth profile of each private VSI in the switch 60, it will not be possible for him to guarantee the blocking performance of the network for all conditions. For example, because of the multi-point nature of the LAN, blocking conditions will always be possible within the privately operated network, i.e., under non-uniform traffic conditions, it will be possible for the customer to operate his private network under a regime where internal traffic flows compete for switching resources. Because of this, the customer will be required to set his own bandwidth profiles so as to maintain the optimum performance of his own private data (again, as if operating his own private resources).

In addition to the above, there is no requirement that the bandwidth assigned to the private VSIs in the switch 60 be directly proportional to the data rate of the private links. For example, at a degree-3 switch location such as the switch 50D, a service provider may offer a GbE connection in each direction connected through a 3 Gbps VSI in the switch 60. This would support a full 1 Gbps throughput between any two locations at any time but at the expense of zero traffic on the third link. Alternatively, the service provider may offer a 1 Gbps VSI to a low bandwidth user (this would obviously constrain the rate on all of the GbE links). In this latter case, it is possible for the service provider to place Committed Information Rate (CIR) limitations on the network (e.g., to a maximum of 500 Mbps).

It is important to note that the EPLAN 402 is not constrained to operate within a single operator's network. Because the handoff between the service provider and client (or another operator) occurs at Layer 1, operator to operator peering is anticipated to be almost as straightforward as traditional Layer 1 private line services. Two operational paradigms are envisaged. In the first, all EPLAN virtual switching takes place within the same operator's network, and connectivity to remote customer locations (across third-party operator domains) is performed using private line 'tails'. This approach simplifies the multi-domain EPLAN by ensuring that the handoff between operators is a simple Layer 1 agreement and that all the 'definition' of private switching is constrained to a single operator. In a second approach, virtual switching is provided by more than one operator. Multiple EPLAN sub-networks are stitched together across Layer 1 interfaces to form the larger EPLAN.

Figure 6:
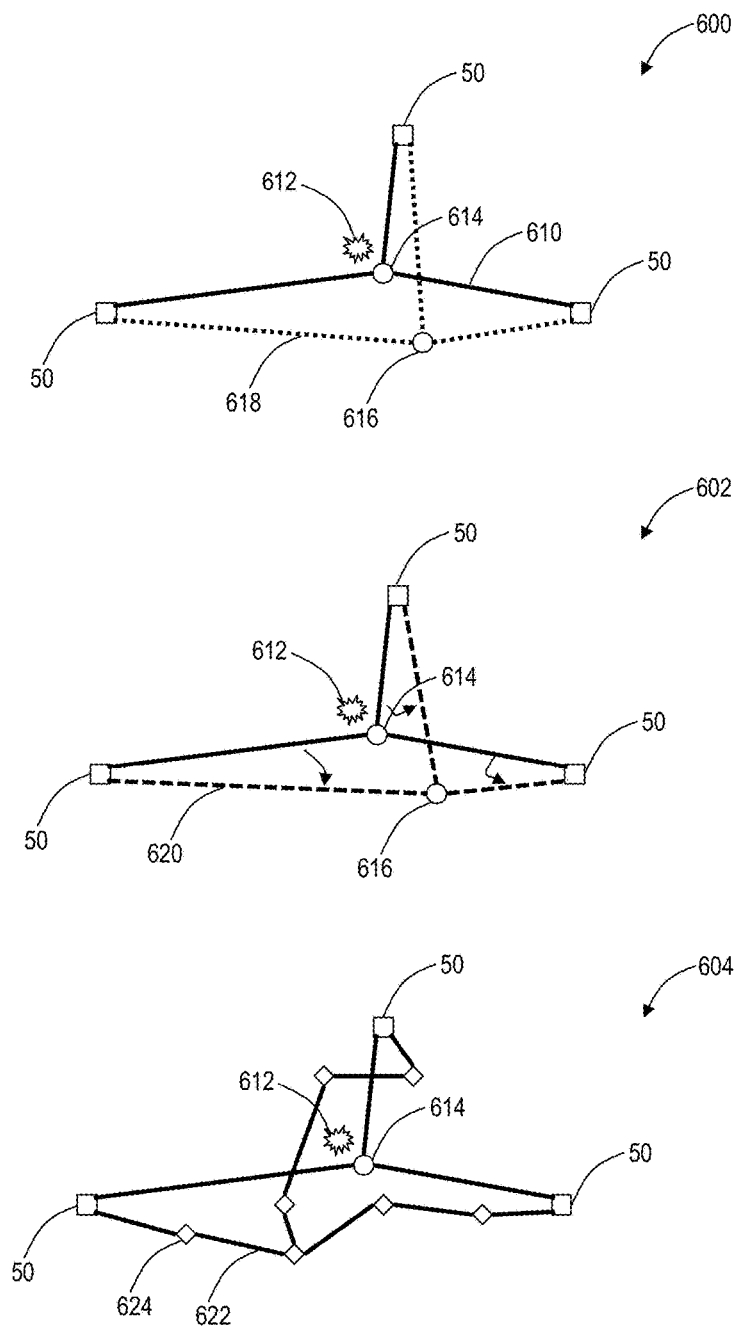
FIG. 6 is a diagram of exemplary methods in which a network operator can protect an EPLAN including a 1:1 dedicated protection option, a mesh restoration option, and an EVPLAN backup option.

Referring to FIG. 6, in an exemplary embodiment, a diagram illustrates various restoration options 600, 602, 604 for an EPLAN. The EPLAN can be designed to survive both link and node (switch) failures. Once isolated EPLAN connectivity has been set up, protection may be performed by the end customer at Layer 2. This is straightforward in the same way that an end customer's network would be protected across a traditional private line-based network. As long as the end customers build sufficient redundancy into their EPLAN topologies, they may use RSTP (Rapid Spanning Tree protocol) or SPB (Shortest Path Bridging) restoration, for example. The EPLAN service provider may also add resiliency to the service. It should be noted that, as a multi-point service, connectivity between multiple end-points must be maintained and so network protection can be more complicated than for a simple point-to-point service. FIG. 6 illustrates exemplary methods in which a network operator can protect an EPLAN including a 1:1 dedicated protection option 600, a mesh restoration option 602, and an EVPLAN backup option 604.

FIG. 6 illustrates three switches 50 with an EPLAN 610 communicatively coupled therebetween via a fourth switch communicatively coupled to each of the three switches 50. Each of the options 600, 602, 604 illustrates a failure 612 at the fourth node. In the dedicated protection option 600, the fourth switch includes two private virtual switching instances 614, 616. Switching instance 616 is most likely located in a separate network element (5$^{th}$ switch) so as to maintain protection diversity. Here, the EPLAN 610 utilizes the private VSI 614 when there is no failure with a CIR equal to 1. The VSI 616 is also dedicated to the service and set to a CIR=1 while there is no failure. With the failure 612, the VSI 616 takes over routing the EPLAN 610 across a protection path 618 for fast, dedicated protection. The mesh restoration option 602 also includes private VSIs 614, 616. However, the VSI 616 is only turn up after the failure 612 when a mesh restored link 620 is up. The mesh restoration option 602 is slower, but also provides dedicated protection. The EVPLAN backup option 604 includes the EPLAN 610 with the VSI 614 upon working condition, and an EVPLAN 622 defined by various shared VSIs 624. With the failure 612, the EVPLAN 622 may be used as a fast, shared pool of protection bandwidth for the EPLAN 610. Further, the EVPLAN backup option 604 may also include mesh restoration with the EVPLAN 622 used immediately following the failure 612, and restoration of the EPLAN 610 following mesh restoration.

Figure 7:
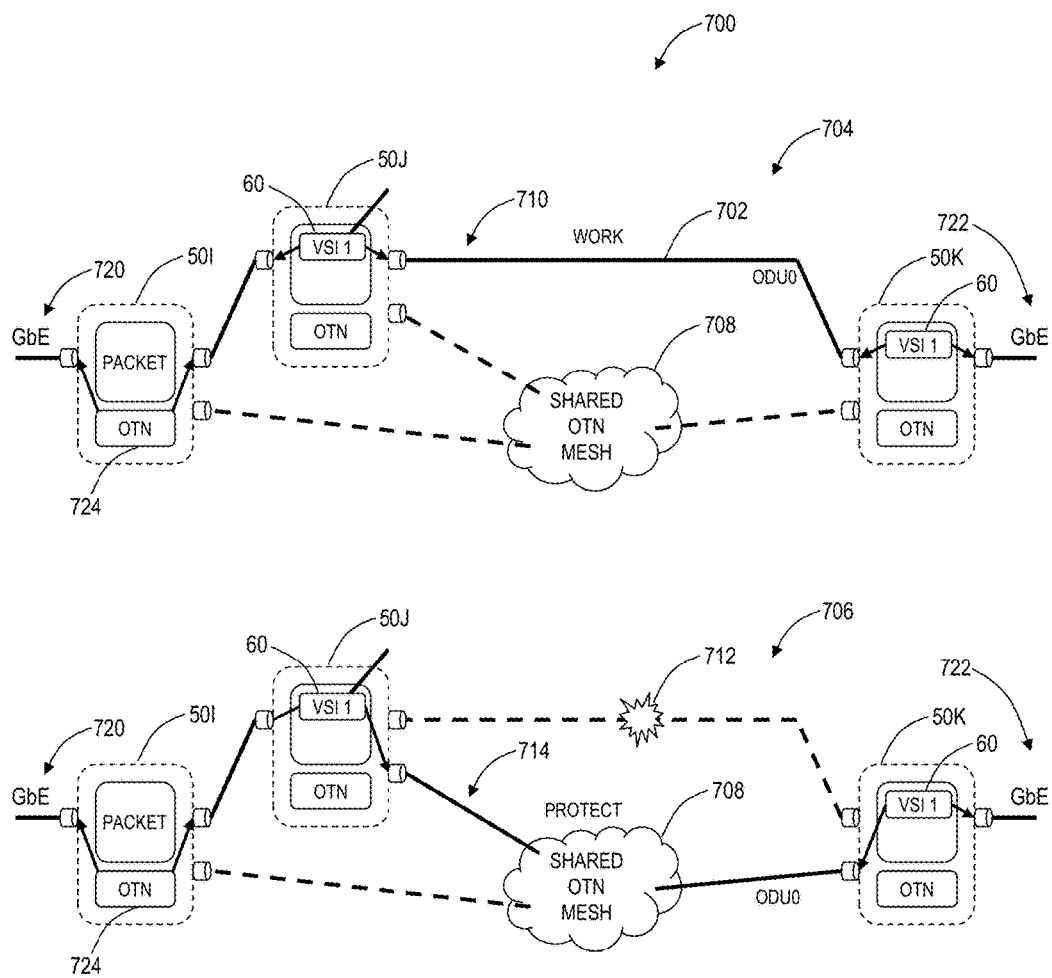
FIG. 7 is a diagram of an exemplary network showing mesh restoration of a failed link for the hybrid packet-optical private network systems and methods.

Referring to FIG. 7, in an exemplary embodiment, a network 700 illustrates mesh restoration of a failed link 702 for the hybrid packet-optical private network systems and methods. The network 700 includes three interconnected switches 50I, 50J, 50K, and is illustrated at two distinct time periods 704, 706. In an exemplary embodiment, the switches 50J, 50K are interconnected therebetween via the link 702 and via diverse links from the link 702 designated as shared OTN mesh 708. In the time period 704, the link 702 is working with the switch 50I including an OTN interface for an EPLAN 710 and the switches 50J, 50K including a virtual switching instance for the EPLAN 710. In the event of a switch or link failure, the multi-point connections that were established through the failure must be recovered. For example, during the time period 706, there is a failure 712 on the link 702 between the switches 50J, 50K. With the EPLAN 710, protecting against a link failure is relatively straightforward. Network operator Layer 1 survivability of the OTN links between the switches 50 may be performed using traditional protection (e.g., Sub-Network Connection Protection (SNCP)) or control plane-enabled mesh restoration. The network 700 illustrates how the EPLAN 710 may be kept operating in the event of the link failure 712 by restoring a broken link using shared bandwidth in the OTN mesh 708. Between the switches 50J, 50K, the EPLAN 710 includes a private VSI 60 at each of the switches 50J, 50K. Connectivity between two GbE ports 720, 722 is achieved by switching the service through an OTN switch 724 on the switch 50I and the private VSIs 60 on the switches 50J, 50K. Any link failure between the switches 50J, 50K is simply restored at Layer 1 using shared OTN resources.

Figure 8:
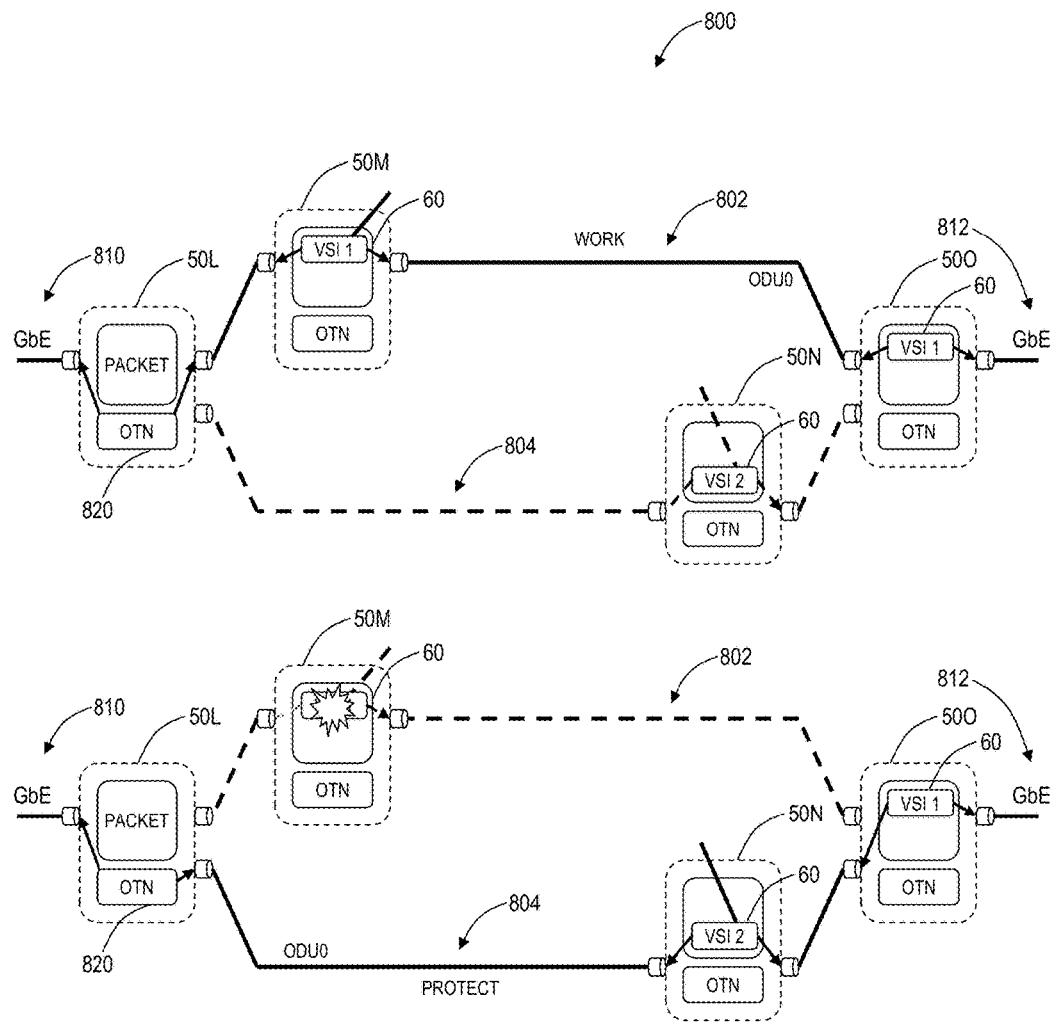
FIG. 8 is a diagram of an exemplary network showing dedicated 1:1 protection of an EPLAN for the hybrid packet-optical private network systems and methods.

Referring to FIG. 8, in an exemplary embodiment, a network 800 illustrates dedicated 1:1 protection of an EPLAN 802 for the hybrid packet-optical private network systems and methods. The exemplary network 800 includes four interconnected switches 50L, 50M, 50N, 50O. The dedicated 1:1 protection includes protecting the primary working EPLAN 802 with a duplicate backup EPLAN 804 that is both node and link diverse from the working network. Specifically, the primary EPLAN 802 is formed between GbE ports 810, 812 through an OTN switch 820 at the switch 50L, a VSI 1 60 at the switch 50M, and a VSI 1 at the switch 50O. The backup EPLAN 804 is formed between the GbE ports 810, 812 through the OTN switch 820, a VSI 2 60 at the switch 50N, and the VSI 1 60 at the switch 50M. In this dedicated protection approach, a third private VSI (VSI 2), i.e., the VSI 2 60 at the switch 50N, is pre-planned and introduced at a location separate from the working EPLAN 802 and provides alternative multi-point switch connectivity to the GbE ports 810, 812. Upon notification of a failed switch at the VSI 1 60 at the switch 50M, the OTN switch 820 and the VSI 1 at the switch 50O connect to the alternative backup EPLAN 804, thus ensuring continued service. By dedicating protection capacity in this way, this solution can be inefficient and costly. If the backup EPLAN 804 is calculated and turned up after a failure has occurred, this same end result could be obtained through multi-layer mesh restoration. In this way, protection bandwidth resources could be shared between multiple service offerings. Instead of restoring a single Layer 1 connection, however, locations of new VSI's would need to be determined and turned up in collaboration with new Layer 1 links. Consequently, a mesh restorative approach is expected to be slower relative to the dedicated 1:1 protection.

Figure 9:
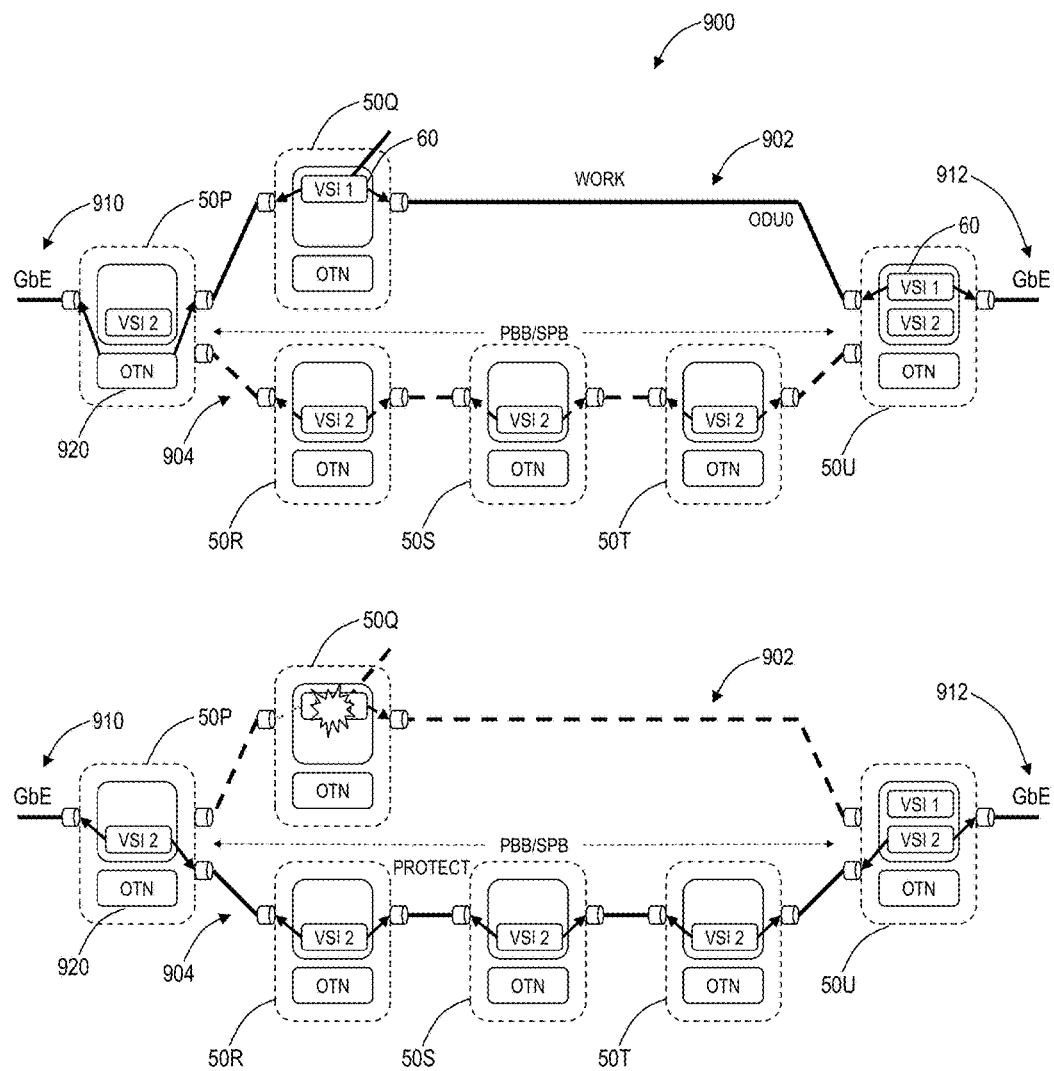
FIG. 9 is a diagram of an exemplary network showing shared backup protection of an EPLAN with an EVPLAN for the hybrid packet-optical private network systems and methods.

Referring to FIG. 9, in an exemplary embodiment, a network 900 illustrates shared backup protection of an EPLAN 902 with an EVPLAN 904 for the hybrid packet-optical private network systems and methods. The exemplary network 900 includes six interconnected switches 50P-50U. The shared backup protection is a restoration response may be achieved by using a combination of EPLAN and EVPLAN techniques for work and protect LANs, respectively. The exemplary network 900 illustrates how the dedicated EPLAN 902 with private VSI and EPL connections may be protected using the shared EVPLAN 904 based on the use of a Layer 2 Ethernet network operating over separate, shared VSIs and Ethernet Virtual Connections (EVCs). In the network 900, the EPLAN is between two GbE ports 910, 912 through an OTN switch 920 at the switch 50P, a VSI 1 60 at the switch 50Q, and a VSI 1 60 at the switch 50U. The EVPLAN 904 includes a 'protection' VSI (VSI 2 60 at the switches 50R, 50S, 50T) defined in every packet fabric between the two GbE ports 910, 912 to act as a shared backup switching resource. A backup LAN topology for each EPLAN service is then planned and implemented across this globally shared Ethernet network using a traditional Ethernet multipoint technique like PBB or SPB. Upon failure of a primary EPLAN switch, the service is cut over onto the shared backup EVPLAN 904. The key point about this approach is that the backup network is implemented and partitioned at Layer 2 and because the backup network is accessible globally (at any switch node), it may be may be shared as the backup resource for many EPLANs.

Clearly, this solution does not provide fully dedicated, private resources under protection conditions and so results in a compromise solution whereby the working LAN is dedicated, but the backup is shared. Because the backup LAN is shared, QoS constraints can be applied to the traffic under failure conditions. For example, to provide fair sharing of the backup EVPLAN 904, it can be assigned a Committed Information Rate (CIR)<1 with Excess Information Rate (EIR)=1 for the service when traversing the protection network. The actual value of CIR would be dependent on the amount of shared capacity and planned extent of sharing. Under protection conditions, frames greater than the allowed CIR would be marked discard eligible based on protection bandwidth availability for the whole network. This approach may be used as a first response to failure but as an intermediate step towards restoring a new private EPLAN (e.g., with the mesh restoration option) and so the extent to which the service actually operates over a shared (Layer 2) network can be minimized.

Figure 10:
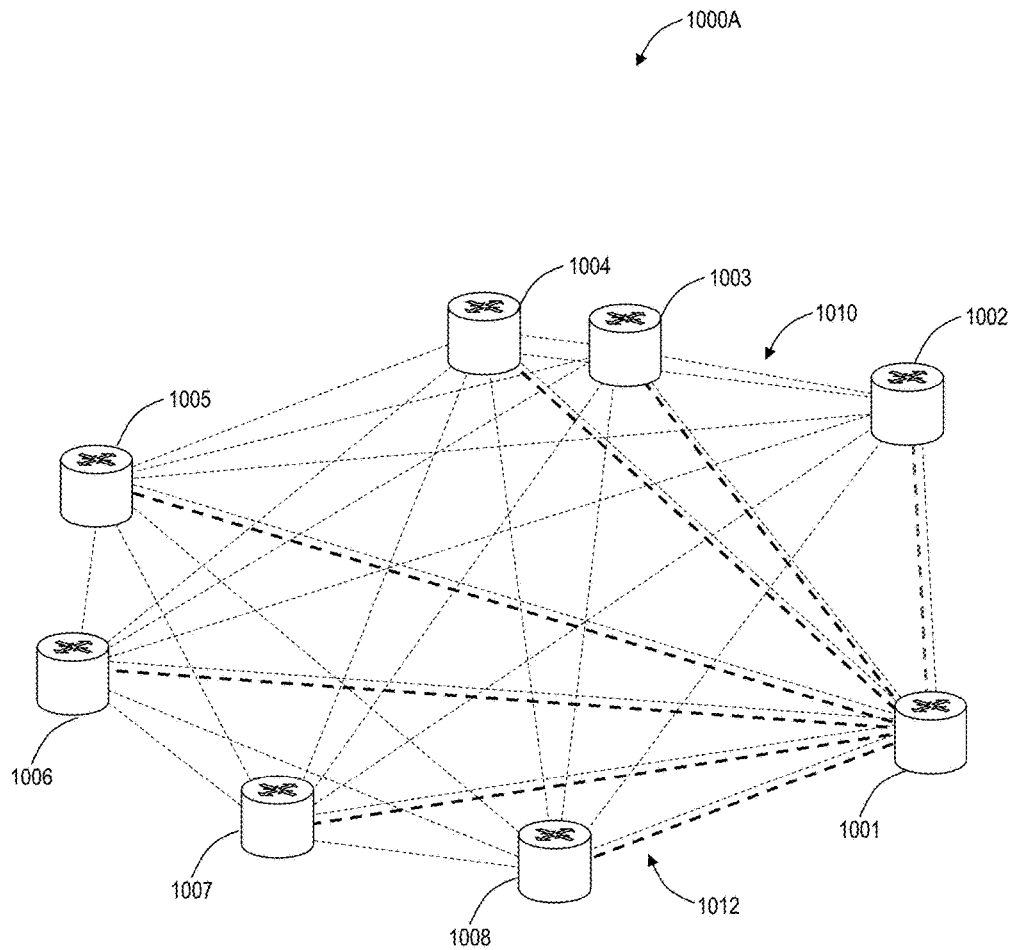
FIG. 10 is a diagram of an exemplary network showing a private enterprise Internet Protocol (IP) network.
Figure 11:
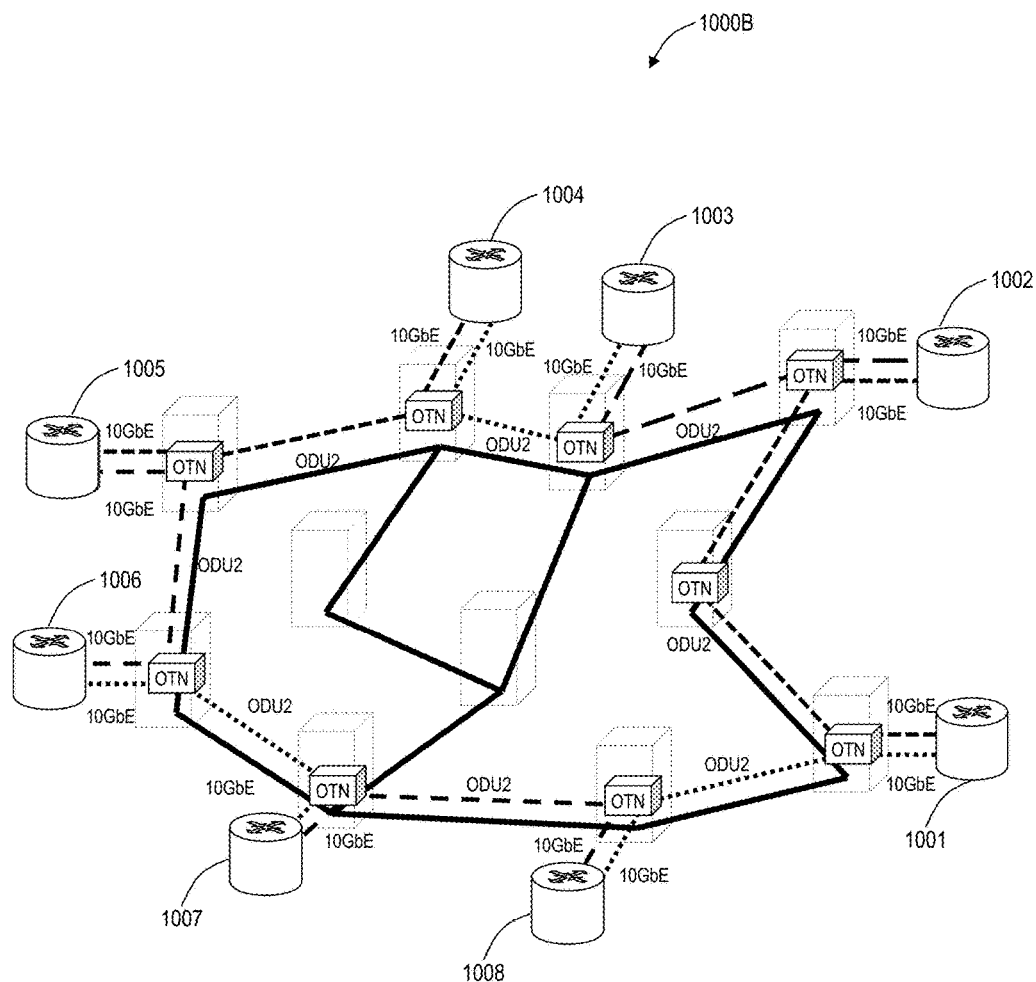
FIG. 11 is a diagram of an exemplary network using dedicated point-to-point private lines for connectivity of the private enterprise IP network of FIG. 10.
Figure 12:
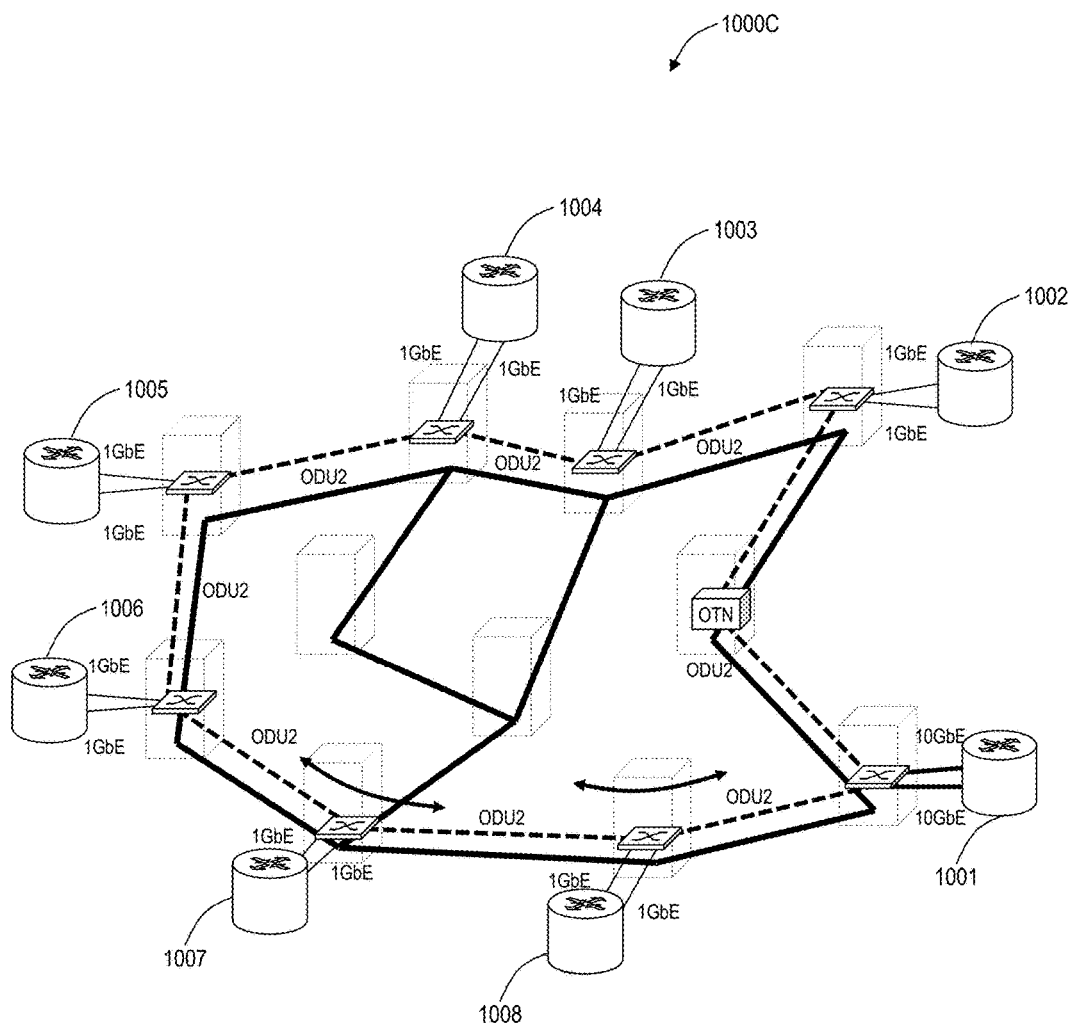
FIG. 12 is a diagram of an exemplary network using EPLANs for connectivity of the private enterprise IP network of FIG. 10.

Referring to FIGS. 10, 11, and 12, in an exemplary embodiment, various network diagrams illustrate networks 1000A, 1000B, 1000C of an exemplary application of EPLANs using the hybrid packet-optical private network systems and methods. Because of its simplicity, the EPLAN is applicable where private multi-point connectivity is desired. In an exemplary embodiment, the EPLAN provides dedicated switching capacity in conjunction with private line connectivity as an attractive networking solution for large enterprises looking to reduce the capital cost of building its own network and the operational costs associated with leasing private lines. Those of ordinary skill in the art will recognize the use of the EPLAN in other application areas is also contemplated. For example, FIG. 10 illustrates the network 1000A showing private enterprise Internet Protocol (IP) router connections. FIG. 11 illustrates the network 1000B showing the private enterprise IP router network using a conventional dedicated private line approach to connecting the routers 1001-1008. FIG. 12 illustrates the network 1000C showing connectivity of the private enterprise IP router network using an EPLAN. Advantageously, the EPLAN can potentially increase the efficiency and reduce the cost of building a private, dedicated IP network. In FIG. 10, a large enterprise requires IP connectivity between eight separate locations each with a private IP router 1001-1008. For example, the enterprise plans for two types of traffic; (i) shared any-to-any traffic with a total bandwidth requirement of 1 Gbps denoted as connections 1010, and (ii) hubbed connectivity to the private IP router 1001 to access a private data center, for example, with a bandwidth requirement of 1 Gbps per location denoted as connections 1012.

Because this enterprise requires dedicated, private connectivity, it can choose to build the connections 1010, 1012 between its router locations using dedicated private lines. FIG. 11 illustrates the network 1000B implementing the connections 1010, 1012 using dedicated private lines. Note, while the network 1000B has a similar topology as the network 400 described herein, other network topologies are supported. A ring topology may be created to provide simple diversity, and 10 Gbps private links (ODU2's) are built between each router location. 10 Gbps is chosen to accommodate the 8 GbE bandwidth requirement, i.e., 7× dedicated 1 GbE links from each of the remote routers to the hub location plus the 1 GbE shared bandwidth between all routers. As a result, the network 1000B results in the use of 8×10 G private lines plus 2×10 G private interfaces between each of the enterprise's private routers 1001-1008 and the carrier's network (i.e., total of 16×10 G WAN-facing router ports). Of note is the inefficiency associated with this approach. Because each private enterprise router 1001-10008 is the device used to forward traffic on behalf of the enterprise, port bandwidth, and routing capacity is being wasted. Each of the remote routers 1002-1008 is only adding/dropping 2 Gbps and forwarding 6 Gbps as tandem traffic.

This inefficiency associated with the network 1000B can be removed through a multi-point EPLAN service from the carrier instead of point-to-point private lines. FIG. 12 illustrates the network 1000C with dedicated virtual switches associated with the EPLAN service keep transit traffic off the private enterprise routers. Note, the network 1000C has a similar topology as the network 400 described herein. Transit traffic between router pairs is forwarded using the private Layer 2 connectivity across each dedicated VSI, and only traffic destined for a local router is dropped at any given location. Based on the desired traffic characteristics described above, this approach results in the use of 8×10 G private lines as part of the eight node EPLAN. Now, only 2×10 G private interfaces are required at the hub router 1001 with only 2×1 G interfaces required at each of the remote routers 1002-1008 (i.e., a total of 2×10 G plus 14×1 G WAN-facing router ports). In conclusion, the inclusion of dedicated, private virtual switching in the form of an EPLAN can improve an enterprise's business case by performing transit bypass of enterprise routers, reducing router port bandwidth requirements and mining router capacity for future growth.

Figure 13:
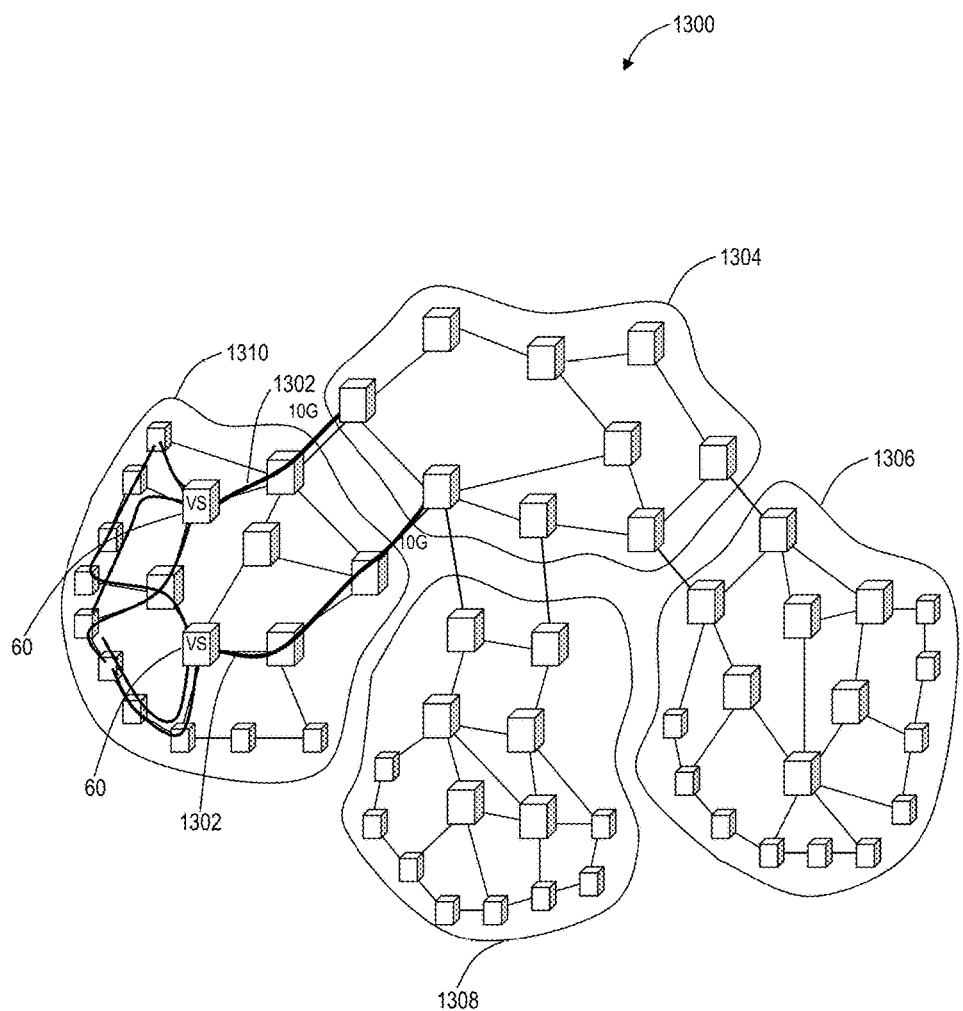
FIG. 13 is a diagram of an exemplary network using EPLANs to backhaul customer data outside a service provider's administrative area or domain.

Referring to FIG. 13, in an exemplary embodiment, a network 1300 illustrates the use of EPLANs 1302 to backhaul customer data outside a service provider's administrative area or domain. For example, the network 1300 may include a plurality of interconnected optical switches including the switches 50 partitioned into various administrative domains 1304, 1306, 1308, 1310. In this exemplary network 1300, the domains 1304, 1306, 1308 are within a service provider's own administrative control with the domain 1310 under the control of another service provider. To gain access to customers outside of the domains 1304, 1306, 1308, the service provider may lease private line capacity from the provider of the domain 1310 between their client locations in their own network. Much of this traffic can be more efficiently managed if it is backhauled at Layer 2 and so often the remote operator will transit traffic through remotely managed switches within shared Point of Presence (POP's) located in the other carrier's area. The EPLAN described here provides a method for the service provider to avoid purchasing space in a Point of Presence (POP). Instead, the service provider may purchase wholesale EPLAN connectivity via the EPLANs 1302 from the service provider of the domain 1310 and backhaul customer traffic over its private LAN via its own dedicated private VSI switches 60 in the domain 1310. As shown in the network 1300, the Layer 2 network running on top of the EPLAN 1302 (including topology and resiliency) is managed by the service provider as an extension of its own 'home' network. This approach becomes more relevant in a highly competitive environment where many network operators are competing for a large number of large enterprise contracts.

Figure 14:
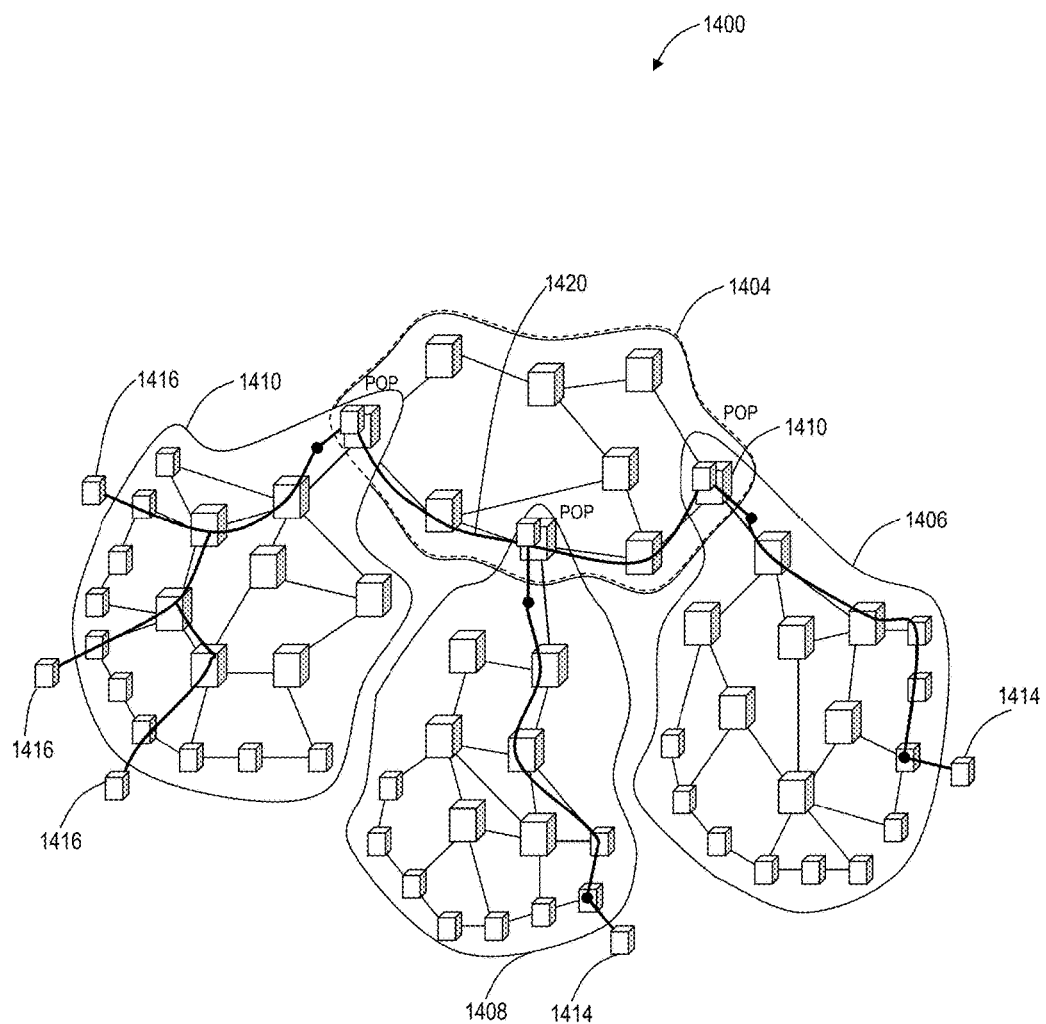
FIG. 14 is a diagram of an exemplary network using EPLANs in a global Carrier Ethernet inter-exchange carrier (CEIXC) for Ethernet private LAN services.
Figure 15:
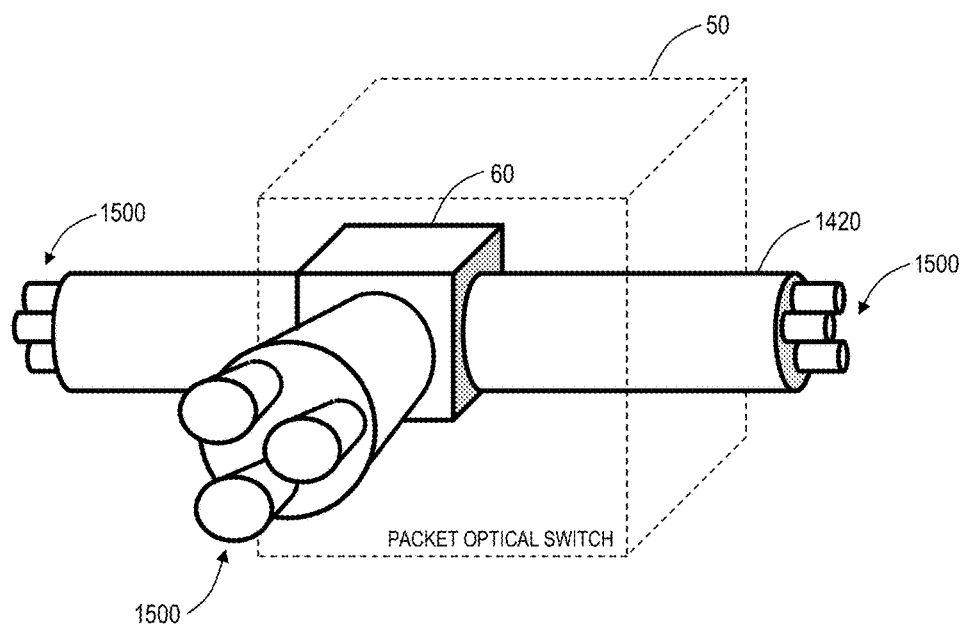
FIG. 15 is a diagram of the EPLAN in FIG. 14 using Mac-in-Mac tunnels within the EPLAN to accommodate multiple virtual customer instances.

Referring to FIGS. 14 and 15, in an exemplary embodiment, a network 1400 illustrates the use of EPLANs 1402 in a global Carrier Ethernet inter-exchange carrier (CEIXC) for Ethernet private LAN services. Somewhat related to the previous application in the network 1300 is the application of a global Carrier Ethernet inter-exchange carrier (CEIXC) for Ethernet private LAN services. For example, the network 1400 may include a plurality of interconnected optical switches including the switches 50 partitioned into various administrative domains 1404, 1406, 1408, 1410. In the exemplary network 1400, the domain 1404 is the CEIXC with each of the domains 1406, 1408, 1410 having a POP 1412 in the domain 1404. The domains 1406, 1408, 1410 may each belong to separate network operators. In this application, the CEIXC domain 1404 establishes the POP 1412 within the home market of different network operators' domains 1406, 1408, 1410 and creates a network between the switch sites. Each network operator then may implement EPLAN connectivity between POPs 1414 in other markets where they have customer presence via an EPLAN 1420. For example, FIG. 14 illustrates this case for the network operator of the domain 1410 with POPs 1414 out of the region and POPs 1416 in the domain 1410.

At a first level of application, connectivity between an out-of-area customer location and its local POP may simply be an EPL defined as GbE or wrapped in an ODU0, this provides simple Layer 1 connectivity to the EPLAN 1420 and hence to the operator's domain 1410 and other private virtual switch locations. In such a scenario, the operator of the domain 1410 would need to implement the dedicated EPLAN 1420 from the CEIXC domain 1404 for each private network instance. Alternatively, at a second level of operation, the operator of the domain 1410 may choose to partition the EPLAN 1420 into multiple EVPLANs over the EPLAN 1420 by using traditional Ethernet networking techniques (such as Virtual LAN (VLAN) separation). For example, as shown in FIG. 15, the operator of the domain 1410 may partition the CEIXC EPLAN 1420 into multiple E-LANs or E-Lines 1500 using Layer 2 Mac-in-Mac tunnels such as Provider Backbone Bridging (PBB), PBB with Traffic Engineering (PBB-TE) or Shortest Path Bridging (SPB). In this case, the out-of-area infrastructure of the operator of the domain 1410 is defined by the private EPLAN 1420 enabled by the Ethernet IXC. The services provided by the operator of the domain 1410 to its multi-area customers are wrapped inside Layer 2 tunnels 1500 (e.g., EVPLANs) wrapped inside the private EPLAN 1420. This approach is subject to more rigorous Layer 2 service interoperability agreements.

Figure 16:
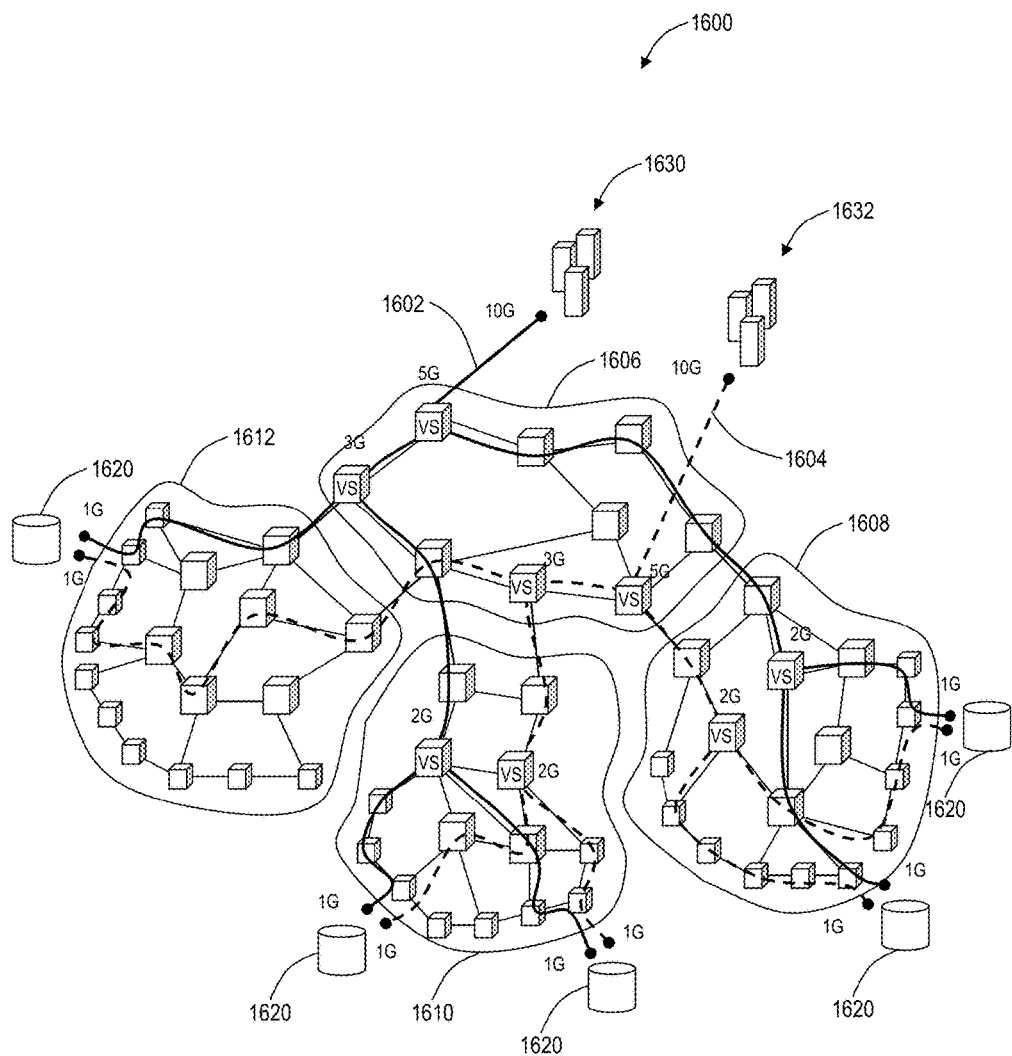
FIG. 16 is a diagram of an exemplary network using EPLANs for private, dedicated data center connectivity.

Referring to FIG. 16, in an exemplary embodiment, a network 1600 illustrates the use of EPLANs 1602, 1604 for private, dedicated data center connectivity. For example, the network 1600 may include a plurality of interconnected optical switches including the switches 50 partitioned into various administrative domains 1606, 1608, 1610, 1612. The action of updating local servers or video cache, from a centralized content source or data center is an application well suited to the EPLANs 1602, 1604. This is an application that is typically associated with Ethernet or IP/MPLS technologies. The exemplary network 1600 illustrates an example where local servers 1620 connect to two content sources 1630, 1632 across multiple network domains using the EPLANs 1602, 1604. In each case, content distribution is performed using Ethernet multicast within dedicated Ethernet private trees. In this example case, a minimum number of four VSIs are used. By dedicating private bandwidth for this service, in-line packet processing, and any potential congestion-induced latency and delay variation are minimized.

Figure 17:
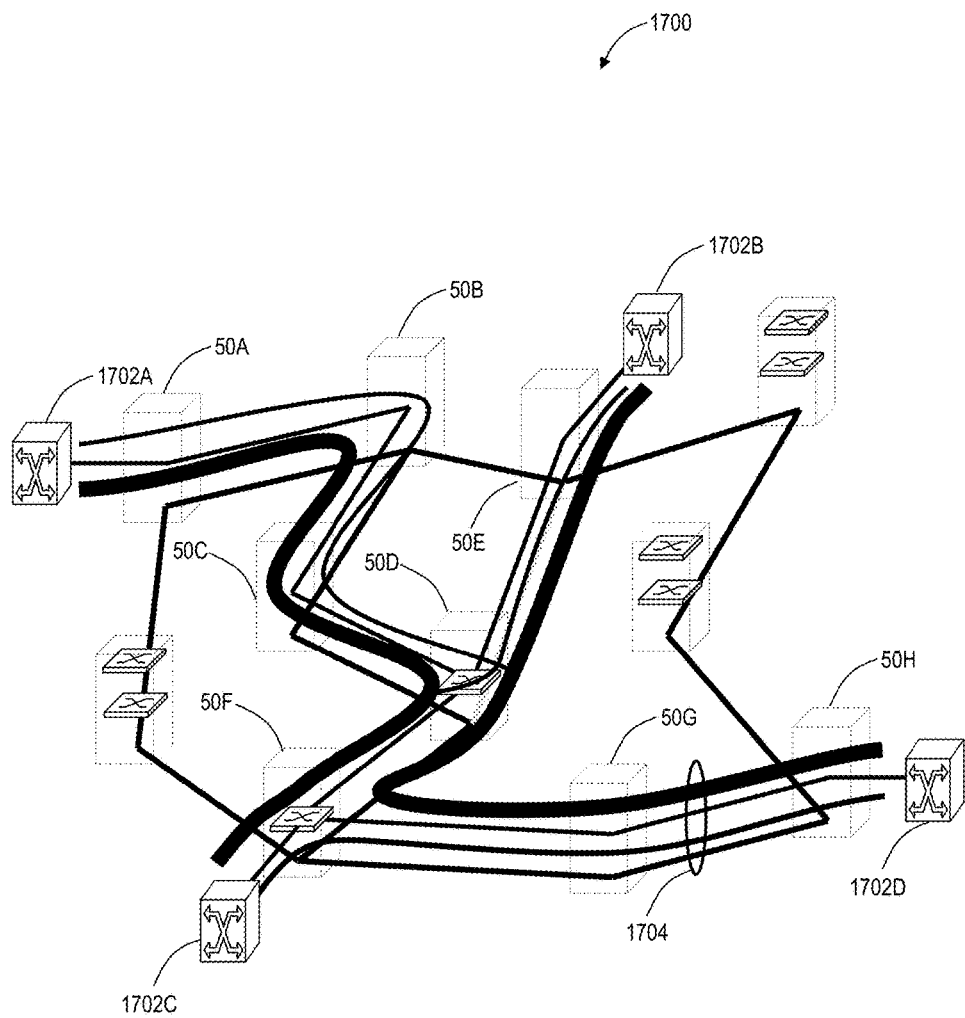
FIG. 17 is a diagram of an exemplary network using EPLANs for data center connectivity at a first time period with first traffic bursts.
Figure 18:
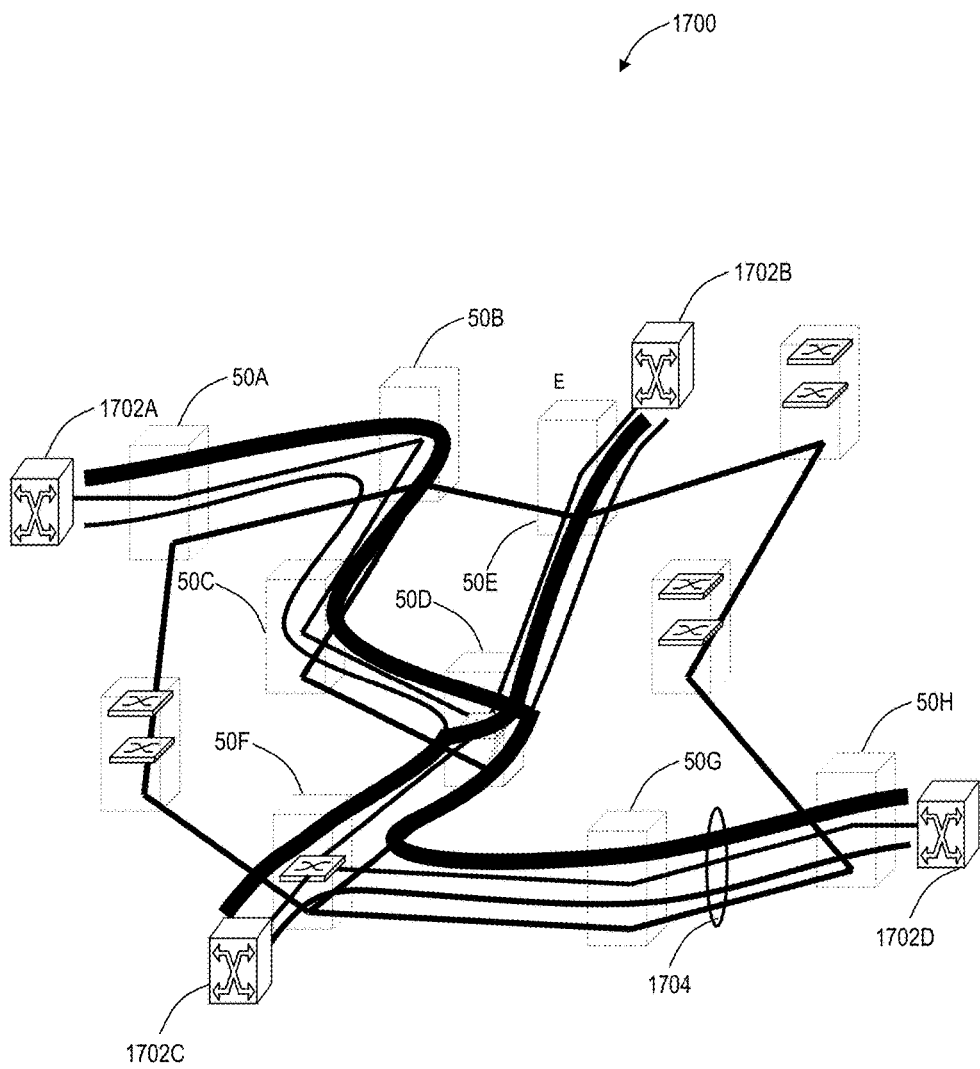
FIG. 18 is a diagram of the exemplary network of FIG. 17 using EPLANs for data center connectivity at a second time period with second traffic bursts.

Referring to FIGS. 17 and 18, in an exemplary embodiment, a network 1700 illustrates the use of EPLANs for data center 1702A-1702D connectivity. Today, there is an increasing need by network operators to provide a network topology that is flexible enough to support a mesh of data centers. These data centers may be (i) owned by a private enterprise, (ii) operated by a service provider and (iii) they may communicate with each other. Large bandwidths are often needed between different data centers at different times of the day to support various types of data transfer, including storage, backup, and general Internet server access. Also, because machine-to-machine traffic is common, low latency and low packet loss are critical requirements. The network 1700 includes an EPLAN 1704 defined by OTN switches at the switches 50A, 50B, 50C, 50E, 50G, 50H and virtual switches 60 at the switches 50D, 50F, i.e., the EPLAN 1704 is similar to the EPLAN 402 in FIG. 4. As shown in both FIGS. 17 and 18, the dedicated EPLAN 1704 provides a way to define private, low latency, yet multi-point connectivity between a selective subset of data centers 1702A-1702D across the WAN. Further, by using Shortest Path Bridging—MAC (SPBM) for example, within the dedicated EPLAN 1702, multipoint Ethernet service connectivity can be defined to accommodate relative changes in bandwidth on demand and support flexible time-of-day resizing of inter-data center connections. Because the SPBM Layer 2 partition is limited to operation across the dedicated EPLAN virtual switches, performance is not impacted by potential congestion imposed by third-party Layer 2 traffic. For example, FIGS. 17 and 18 both illustrate the EPLAN 1702 with SPBM. In FIG. 17, at a first time period, larger traffic flows (denoted by thicker lines in the EPLAN 1702) are seen between the switch 50A and the switch 50F and between the switch 50E and the switch 50H. In FIG. 18, at a second time period, larger traffic flows are seen between the switch 50A and the switch 50H and between the switch 50E and the switch 50F.

Figure 19:
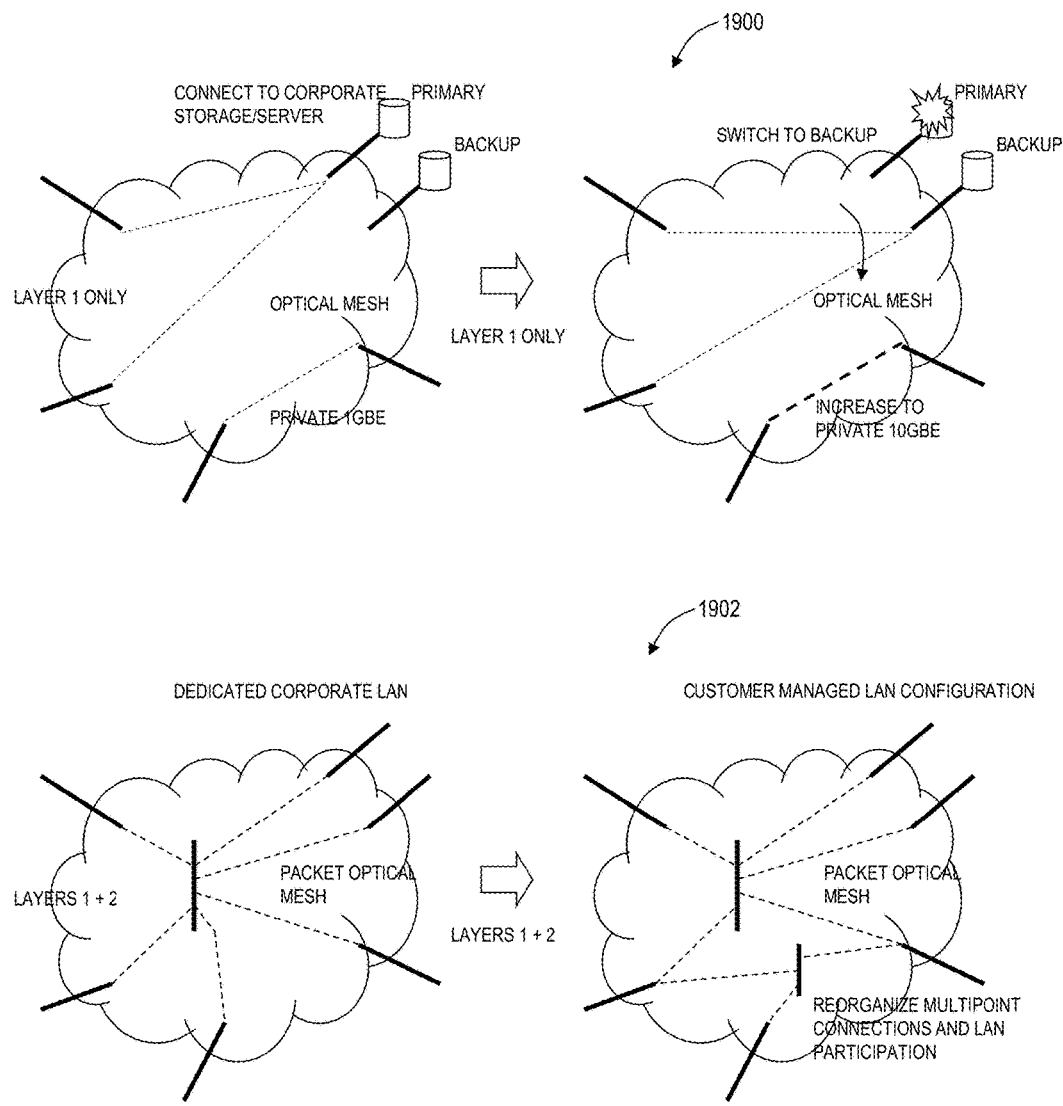
FIG. 19 is a diagram of exemplary networks showing an optical Virtual Private Network (VPN) using customer-managed point-to-point connections and using EPLAN with customer-managed multi-point connections.

Referring to FIG. 19, in an exemplary embodiment, networks 1900, 1902 illustrate an optical Virtual Private Network (VPN) using customer-managed point-to-point connections and using EPLAN with customer-managed multi-point connections. Specifically, the EPLAN approach may also be considered as an enhancement to an optical VPN service currently productized using a control plane-enabled optical switch 50. Conventionally as illustrated in the network 1900, the optical VPN provides reconfigurable and private Layer 1 point-to-point connections between a multiple set of user interfaces (UNIs). It is a port-based service with customer-managed Layer 1 resources where customers can change connectivity, destination and/or bandwidth between any two points within service-defined network partition. In the network 1902, the EPLAN may be regarded as an evolution of this optical VPN. In addition to private, customer managed Layer 1 point-to-point connectivity, the EPLAN provides reconfigurable and private Layer 2 multipoint connections between multiple set of user interfaces (UNIs). The new solution is also a port-based service but with customer-managed Layer 1 and Layer 2 resources.

Figure 20:
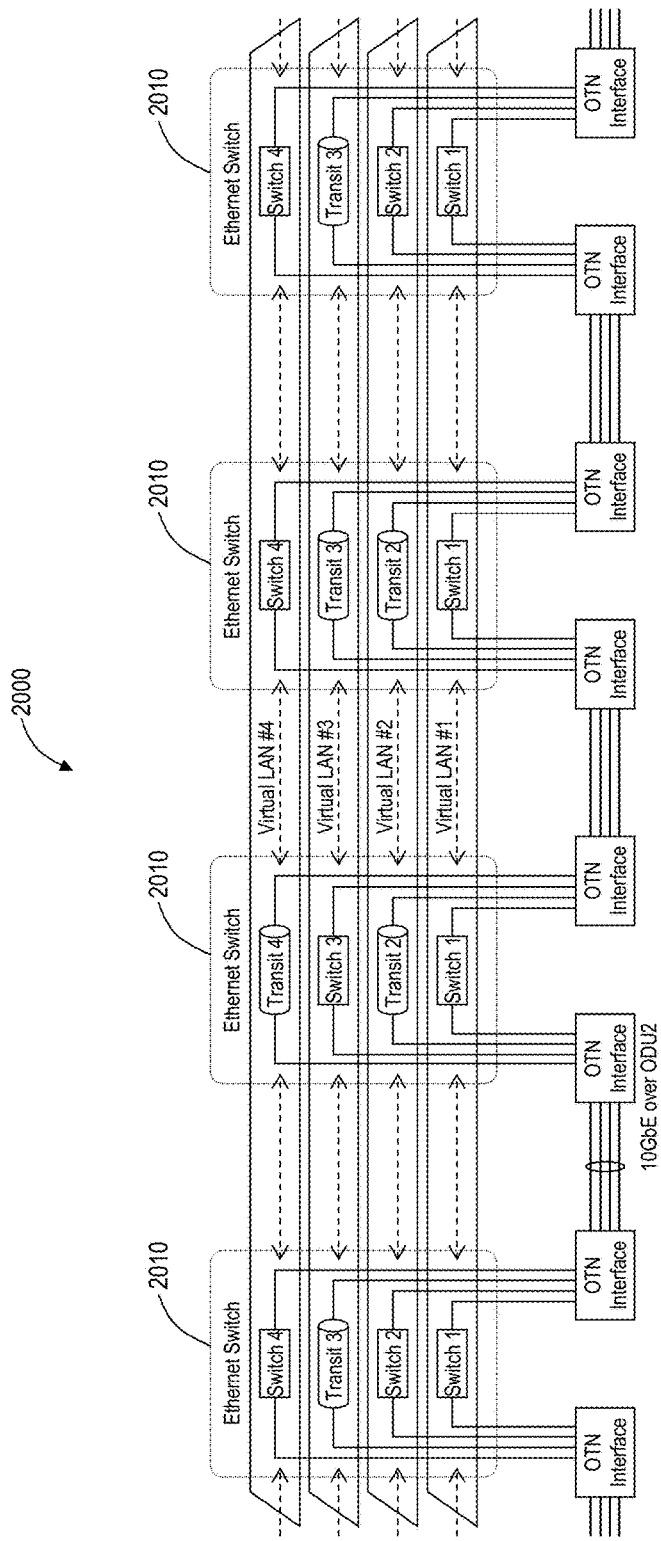
FIG. 20 is a diagram of an exemplary network showing a traditional shared Ethernet private LAN.
Figure 21:
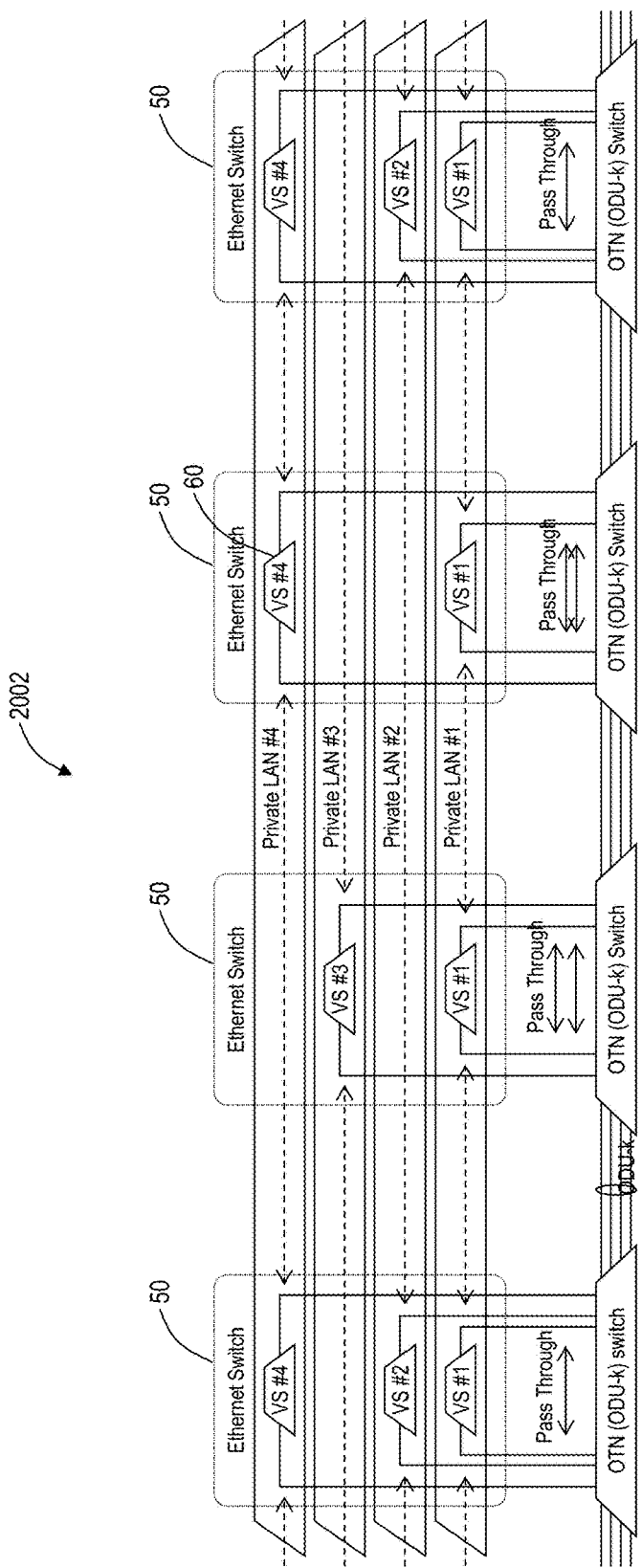
FIG. 21 is a diagram of an exemplary network showing an EPLAN over interconnected hybrid packet-optical switches.

Referring to FIGS. 20 and 21, in exemplary embodiments, networks 2000, 2002 illustrate a traditional shared Ethernet private LAN compared to an EPLAN. The network 2000 illustrates a traditional shared Ethernet private LAN with four interconnected Ethernet switches 2010 with four virtual LANs (labeled Virtual LAN #1-#4). Between the Ethernet switches 2010, each of the virtual LANs is transmitting in a common 10 GbE over ODU2. In this traditional approach, each of the Ethernet switches 2010 supports all LAN services at each location providing an inefficient use of packet fabric for transit traffic. Specifically, transit traffic may be defined as virtual LAN traffic that merely bypasses the Ethernet switch 2010. For example, the virtual LANs require either switching or transit at each of the Ethernet switches 2010 where both of these functions are implemented by the Ethernet switch 2010 in this traditional approach limiting service revenue potential and complicating enterprise/wholesale customer management visibility due to sharing of resources on the Ethernet switch 2010.

The network 2002 illustrates an EPLAN between interconnected hybrid packet-optical switches 50. Similar to the network 2000, the network 2002 includes four private LANs (labeled Private LAN #1-#4). In contrast to the network 2000, the network 2002 transports each of the Private LANs as a dedicated ODU-k per private LAN between the switches 50 with physical bandwidth partitioning providing dedicated and secure customer capacity. Further, the network 2002 is more efficient in terms of packet switch fabric. Instead of using the Ethernet switch 2010 for each private LAN, the network 2002 uses a virtual switch 60 on the switch 50 only where switching is required. Otherwise, transit traffic for each private LAN is passed through at the OTN level. As described herein, the EPLAN only requires switching at locations of degree 3 or more from the perspective of the EPLAN. At sites of degree 2, the EPLAN is simply passed through at the OTN level providing more efficient usage of packet switch fabrics.

Figure 22A:
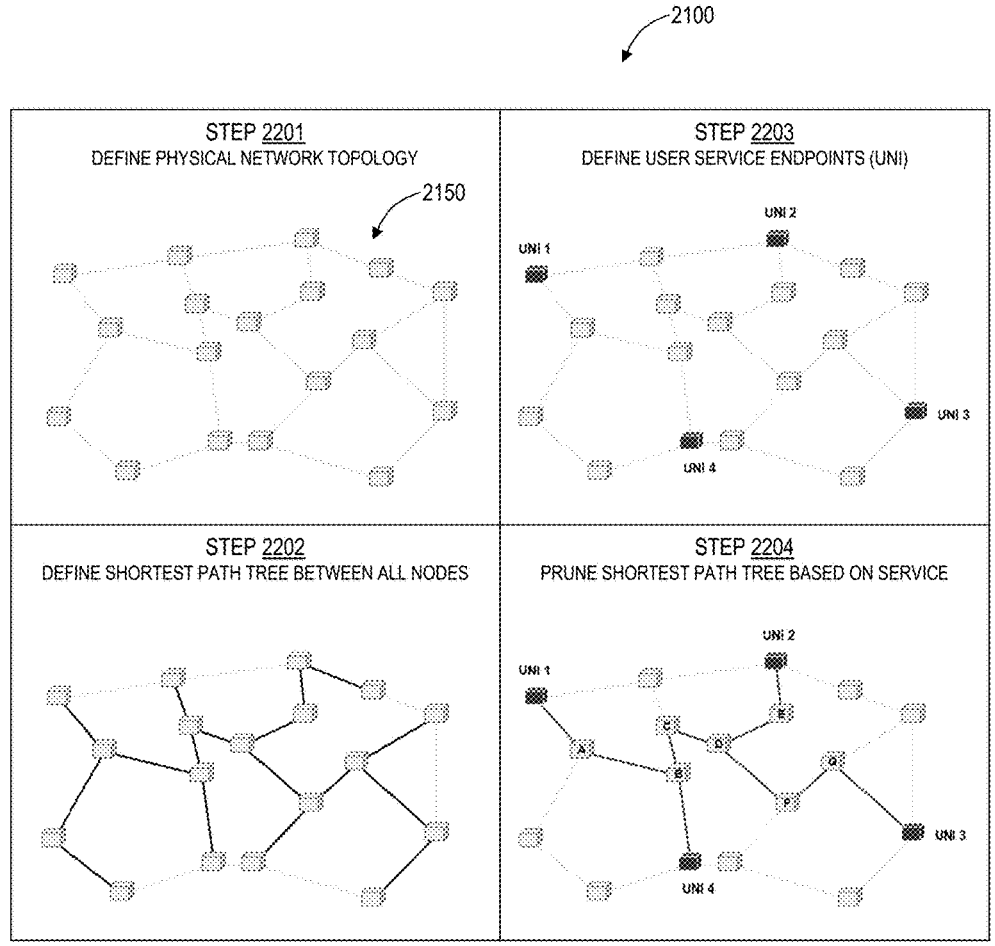
FIGS. 22A and 22B are a flowchart of a method for how a network of links and Layer 2 virtual switching locations for an EPLAN may be planned and implemented.
Figure 22B:
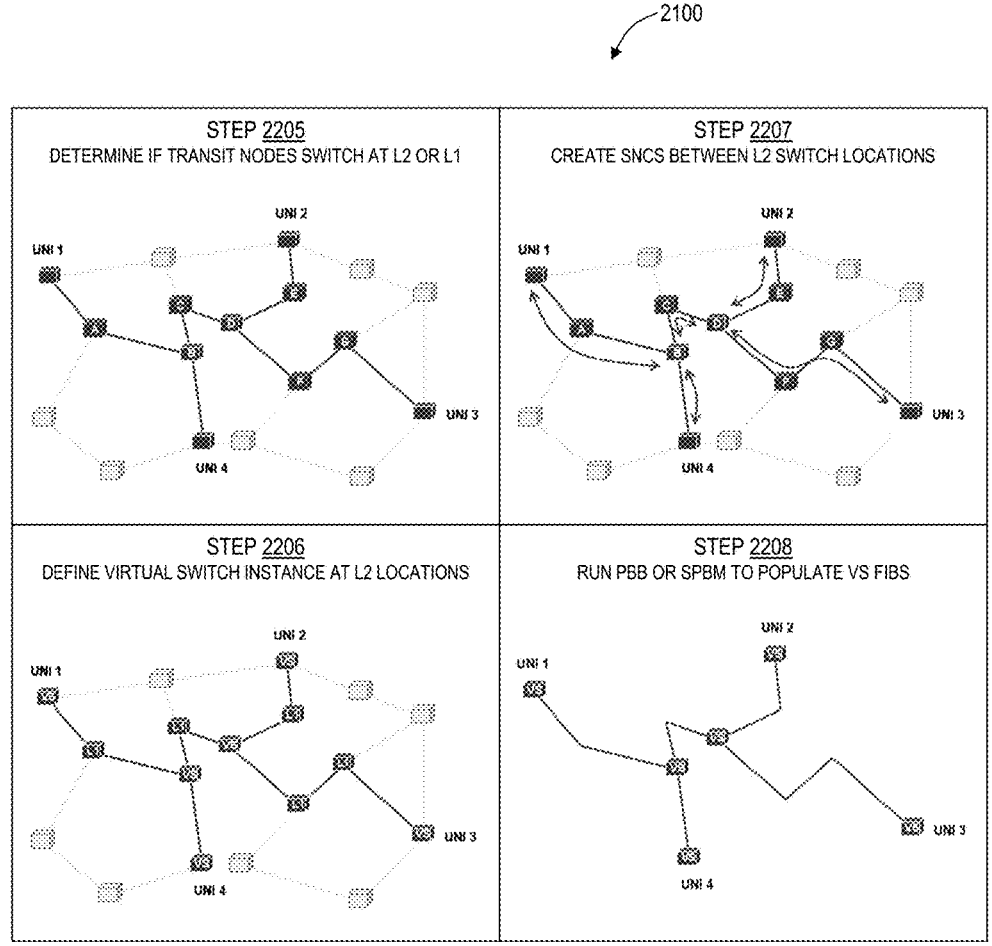

Referring to FIGS. 22A and 22B, in an exemplary embodiment, a flowchart illustrates a method 2100 for how a network 2150 of links and Layer 2 virtual switching locations for an EPLAN may be planned and implemented. In FIG. 22A, first, a physical network topology is defined (step 2201). The network 2150 on which an EPLAN is built is defined in terms of links and switch nodes. As described herein, each switch includes both OTN (TDM) and Ethernet (Packet) fabrics. For the links, hybrid OTN/Ethernet line interfaces support combined OTN and Ethernet traffic. Next, a shortest path tree is defined between all nodes (step 2202). Using Ethernet bridging techniques, a loop-free shortest tree between all network locations may be planned. For example, Ethernet's spanning tree protocol or shortest path bridging (SPB) path computation may aid in the definition of loop-free connectivity. Next, user service endpoints (user-network interface (UNI)) are defined (step 2003). The user endpoints for the private multi-point service are defined. These are shown in the figure as UNI locations. At this point, EPLAN connectivity and participating virtual switches between the UNIs is not known. The shortest path tree is pruned based on service (step 2004). Now that UNIs are known, and the shortest path tree has been defined, the tree may be pruned (e.g., based on Ethernet I-SID) to provide a minimized loop-free connection between all the participating UNIs. For example in the network 2150, in addition to the four UNIs, seven switches (A, B, C, D, E, F, and G) participate in the LAN.

In FIG. 22B, the method 2100 determines if transit nodes switch at Layer 2 (step 2205). Here, the minimum number of Layer 2 virtual switches is identified required to build the network 2150. In this case, switches B and D are required to forward at Layer 2. Switches A, C, E, F, and G are simple transit switches and may be implemented at Layer 1. Next, virtual switch instances are defined at Layer 2 locations (step 2206). To provide dedicated switching resources for this EPLAN service, a dedicated virtual switch instance is defined at each of the Layer 2 switch locations. This allows the EPLAN network 2150 to build an independent and dedicated Layer 2 topology between the minimum set of Layer 2 switches. Switches A, C, and E are not visible at Layer 2 for the specific private LAN being defined in the network 2150. The only Layer 2 switches that are visible are B, D and the edge clients. Of course, switches A, C, and E may participate at Layer 2 for another private network instance. Layer 1 subnetwork connections (SNCs) are created between the Layer 2 switch locations (step 2207). Direct private connectivity is established between each of the EPLAN virtual switches using OTN SNCs (e.g., at ODU0 for GbE or ODU2 for 10 GbE links). These may be turned up as soft permanent connections via ASON/GMPLS control plane, for example. Finally, forwarding tables are populated (step 2208), and the switches in the network are configured to provide a private line service between the UNI endpoints. Note, forwarding is one exemplary method of switching packets, and the systems and methods described herein contemplate other methods such as, for example, MPLS-Transport Profile, pseudowires, or any other packet switching/forwarding techniques. Now that EPLAN private connections and private switch resources have been established, the Ethernet network auto discovers and populates its forwarding tables associated with its limited private connectivity set.

In an exemplary embodiment, the method 2100 may be implemented via the management system 110. For example, the management system 110 may include a user interface to enable a network operator to input required data, i.e., UNI service endpoints, etc., and the management system 110 may, in conjunction with a control plane, automatically, on-demand provision an EPLAN such as through the steps illustrated in the method 2100. In an exemplary embodiment, the management system 110 may automatically select the shortest path, prune the shortest path based on the service, and select Layer 1 and Layer 2 switch locations. In another exemplary embodiment, the management system 110 may provide suggestions to the network operator who may accept or modify the suggestions of the management system 110. Once defined, the management system 110 may be configured to implement the EPLAN through communication over management channels or via the control plane to the various nodes in the network 2150.

In many countries, incumbent network operators are constrained by government regulatory bodies to offer fair access to customers for all service providers. In many cases, this results in a metro/access network where traffic transfer between the incumbent and competitors occurs across a standard physical port. Previously, for example, this port would have been E1 in Europe or T1 in North America. Looking forward, the standard port of choice is becoming the GbE. The EPLAN described herein provides a compatible and fair approach to provide multi-point infrastructure connectivity to multiple competitive service providers in the broadband access space.

Figure 23:
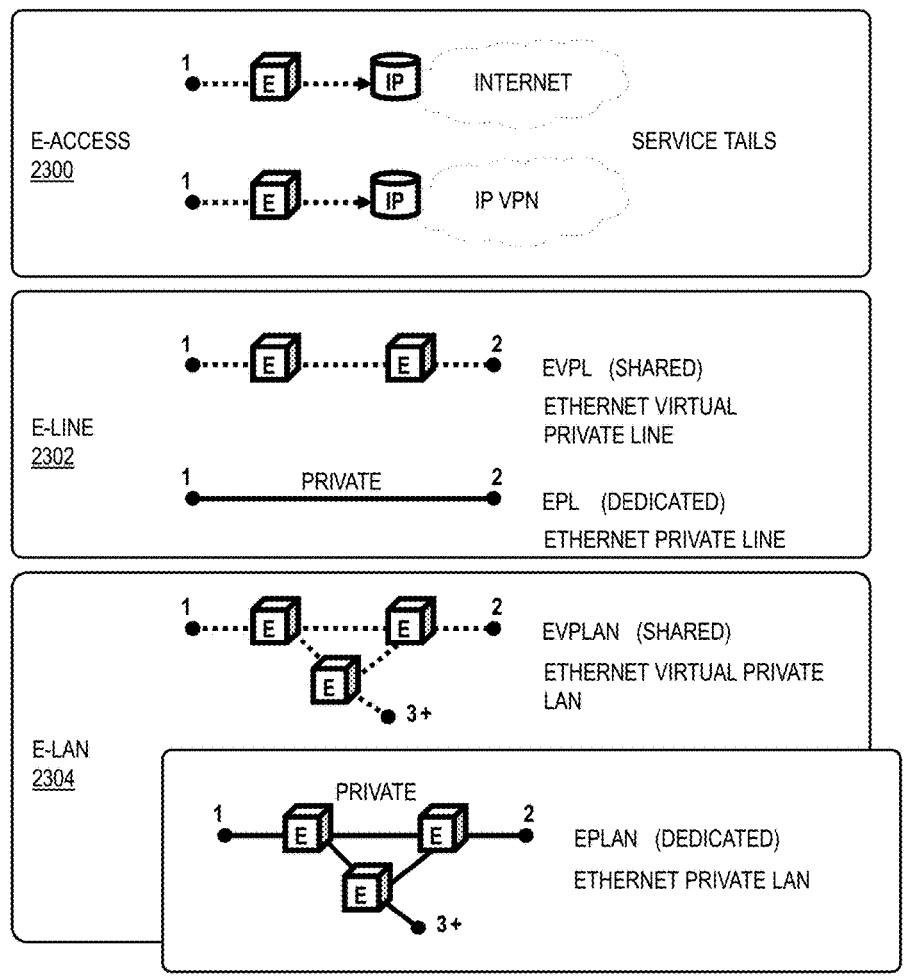
FIG. 23 is network diagrams of MEF-defined Carrier Ethernet services relative to the EPLAN service described herein.

Referring to FIG. 23, in an exemplary embodiment, network diagrams illustrates MEF-defined Carrier Ethernet services relative to the EPLAN service described herein. The MEF-defined Carrier Ethernet services include E-Access 2300 (for service tails), E-Line 2302 (for point-to-point), E-LAN 2304 (for multi-point) and E-Tree (for hub/spoke) (not shown) connections. Depending on how bandwidth is allocated (i.e., dedicated or shared), these services may be defined as "Private" or "Virtual Private" services. These services are growing in popularity and form the basis of future private and public network connectivity. To create multi-endpoint E-LAN connectivity, a client customer can deploy the EVPLAN as a virtual private service. Here, multi-point bandwidth is assigned at Layer 2 through the use of packet tagging and oversubscription is allowed. EVPLAN services are offered at a range of data rates from a few Mbps to Gbps and are typically implemented in native Ethernet or MPLS/VPLS technologies. Layer 2 switching and transmission resources are shared with other services on the network. The EPLAN service described herein is a private service. It is similar to the Ethernet Private Line (EPL) in that bandwidth is dedicated to the service and oversubscription is not allowed. However, it is different from the EPL in that Layer 2 switching must be provided to enable LAN connectivity between more than two user endpoints.

Figure 24:
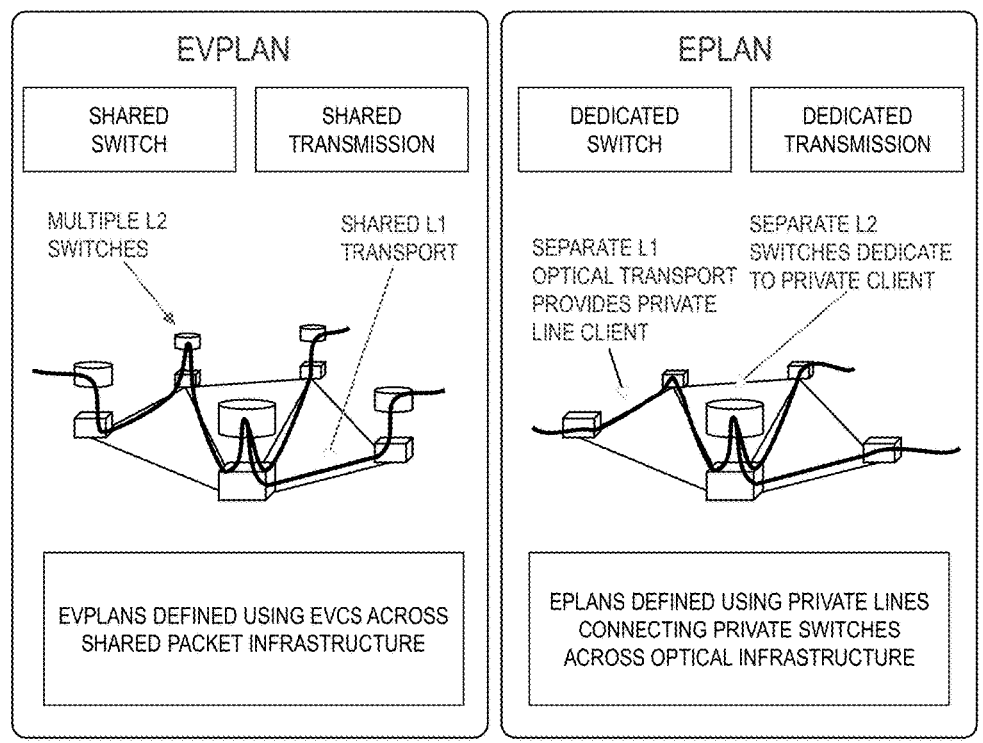
FIG. 24 is network diagrams of a comparison between EVPLAN and EPLAN services.

Referring to FIG. 24, in an exemplary embodiment, network diagrams illustrate a comparison between EVPLAN and EPLAN services. The virtual private EVPLAN service is popular because it offers a network operator the opportunity to oversubscribe bandwidth and, therefore, make efficient use of network resources. While in many respects it is advantageous to multiplex many packet services across a single packet infrastructure (e.g., using IP, MPLS or native Ethernet technologies), many customers require dedicated and private connectivity. Consequently, implementations that partition network resources at Layer 2 (or Layer 3) do not offer the large enterprise or wholesale customer the dedicated bandwidth privacy they require. This market segment has a need for private EPLAN connectivity. A number of approaches exist for EPLANs, such as described as follows. First, separate physical Ethernet networks could be operated over different physical network topologies. This requires that dedicated, separate Ethernet switches are used for each EPLAN service and connectivity to those switches is provided over EPL links. Unfortunately, this implementation is counter to the ongoing desire for convergence of network resources and consequently can be operationally challenging and expensive to deploy.

Second, separate Ethernet network instances using VLAN or I-SID differentiation could be operated on a common Ethernet infrastructure. This approach does not provide the full degree of partitioning provided in the previous example, but resources can be reserved with premium level SLA (e.g., 100% CIR, 0% EIR) in the Layer 2 network and dedicated to the EPLAN service. As an Ethernet bridged network, this approach is advantageous in that the service bandwidth demands scale linearly with the number of user endpoints (N). However, it is still fundamentally a shared Layer 2 implementation. Therefore, to make sure that all sites offer the potential to act as an add/drop location (or a UNI), all Ethernet bridges must participate in a single network topology (within which specific service instances are defined). Third, separate Ethernet network instances could be operated across separate MPLS or VPLS connections. This can be costly due to the higher cost per bit of IP/MPLS devices (relative to Ethernet switches). In addition to the transit issue described previously, MPLS/VPLS suffers from an $N^2$ scaling inefficiency associated with the management and control of the mesh of pseudowires and label switched paths that need to be configured to emulate the Ethernet bridging function.

Each of the foregoing is not ideal for the private bandwidth customer either due to cost, inefficiency or lack of trust in the shared Layer 2 or Layer 3 approaches. Instead of using the above methods, many enterprise customers continue to choose to build their own private networks using multiple EPLs connecting their own switches together in a mesh configuration. This results in an $N^2$ connectivity inefficiency and the added operations complexity of operating their own WAN switches. From a network operator perspective, in the face of anticipated 10×-100× traffic growth over the next few years, it is not obvious that they will be able to continue to operate cost-effectively and manage traditional virtual private networks at Kbps or Mbps traffic granularity. High bandwidth multi-point LAN service connectivity is an important network solution for both large enterprise and network operator.

The EPLAN implementation described herein is a solution for a private and dedicated multipoint Ethernet Private LAN (EPLAN) that takes advantage of network virtualization at the packet and optical layers. The EPLAN is primarily a Layer 1 infrastructure service with the inclusion of reserved, dedicated packet switch capacity upon which clients can build their personal, private Layer 2 networks. The EPLAN described herein is different from other E-LAN implementations that are typically built using Layer 2 technologies only, such as MPLS or Ethernet VLANs. In the case of this EPLAN, Layer 2 networking methods are not used to partition the isolated LAN connectivity. Instead, dedicated Ethernet Private Lines (EPLs) are created between dedicated virtual switching instances (VSIs) that are defined, as necessary, within larger packet-optical switches. Each VSI is partitioned from the remainder of its packet switch fabric as a dedicated, private resource for a specific EPLAN. A Layer 2 network is then built by the customer on top of the private EPLAN bandwidth and operated by the customer as an isolated, private network with no influence by other carrier's network resources.

With the EPLAN, any interface to (i) a client or (ii) another carrier is a Layer 1 "port." The port may be configured as an Ethernet PHY such as GbE or 10 GbE or as an OTN-framed Ethernet signal such as ODU0 or ODU2, for example. Because it is a port-based approach, the EPLAN is compatible with the operations practice of carrier transport teams and not necessarily the data teams who would normally operate LAN connectivity services. While some Layer 2 network functionality is involved, it is only associated with the unique EPLAN service and the customer's overlay network. Because of this independence from all other traffic on the carrier's network, the data operations or planning teams are likely to be a client of this service. This solution provides an Ethernet LAN service offering on a packet-optical transport platform that is differentiated from those offered on pure packet switch and router platforms. It provides basic private transport functionality that packet-only platforms cannot support. The EPLAN takes advantage of the ability to switch Layer 1 OTN and Layer 2 Ethernet within the same packet-optical switching network element.

Figure 25:
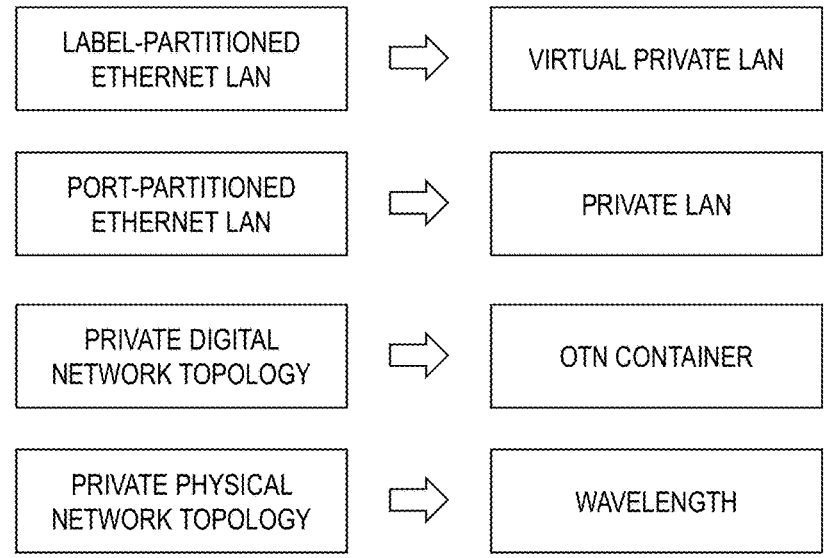
FIG. 25 is a block diagram of multiple tiers of separation for assured networks with the EPLAN.

Referring to FIG. 25, in an exemplary embodiment, a block diagram illustrates multiple tiers of separation for assured networks with the EPLAN. Because of the hybrid packet-optical approach to separating network resources, the EPLAN provides an optional tier to network security. Networks that use the EPLAN benefit from multiple layers of resource partitioning to improve privacy and assurance. The multiple layers include a private physical network topology at a wavelength layer, a private digital network topology via an OTN container, a port-partitioned Ethernet LAN via a private LAN, and a label-partitioned Ethernet LAN via a virtual private LAN. The partitioning of different technologies' resources can build customizable and secure network walls around private networking domains.

Figure 26:
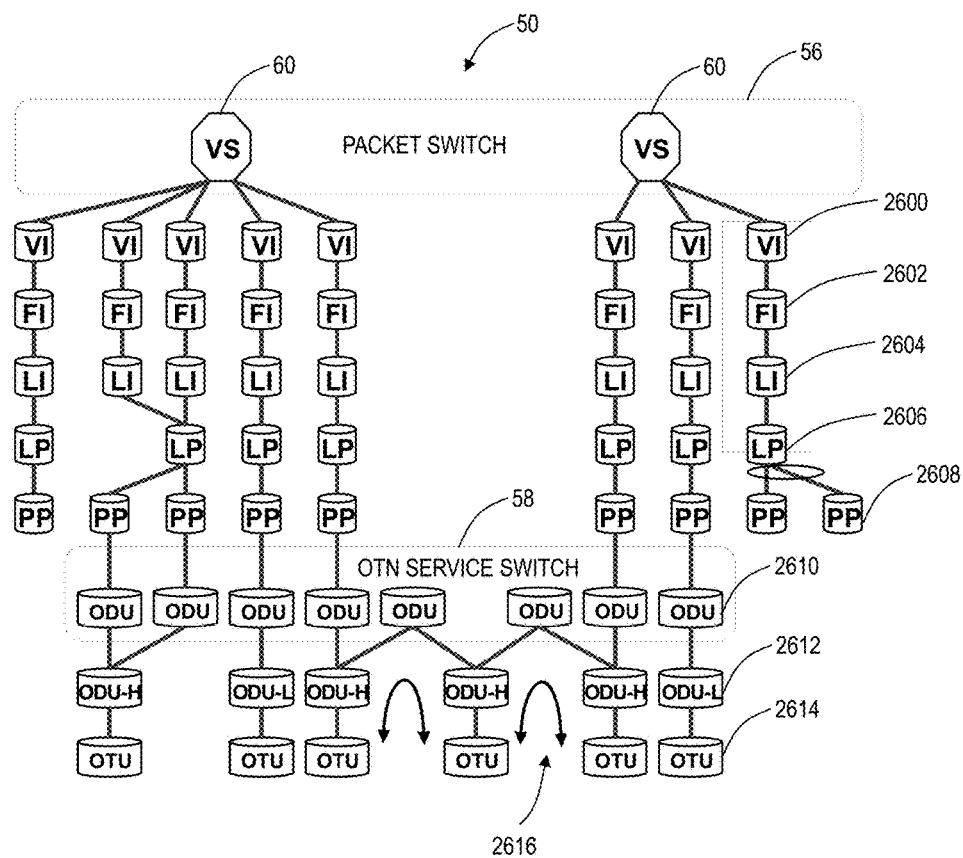
FIG. 26 is a block diagram of a combination of packet virtual switching and OTN switching in the hybrid packet-optical switch.

Referring to FIG. 26, in an exemplary embodiment, a block diagram illustrates a combination of packet virtual switching and OTN switching in the hybrid packet-optical switch 50. Private switching is supported at both Layer 1 and Layer 2. At Layer 1, when Layer 2 forwarding is not required at transit locations, private switching is performed using the OTN switch fabric 58 with ODU-k granularity. At Layer 2, the packet switching fabric 56 is partitioned into multiple virtual switching instances (VSI) 60 that operate as independent Ethernet switching entities. For the EPLAN, private Layer 2 switching is achieved by dedicating a VSI to each EPLAN service. The capacity of the reserved VSI is defined as part of the private service offering (e.g., for a GbE service with three connecting ports, the VSI may be sized to switch 3 Gbps). Other VSI's may be defined within the same switching system to support other EPLAN services and/or a single VSI may be reserved to support shared virtual private EVPLAN services, also.

Private transmission can be achieved by wrapping a GbE or 10 GbE PHY in an ODU0, ODU2, ODUflex, etc. container and multiplexing into, for example, an ODU4 (100 Gbps) in the same way that an EPL would be carried. In FIG. 26, it can be seen how different virtual switches (VS) 60 may independently support different packet switching technologies and how each virtual switch may be directly associated with a set of physical ports (PP). Client packets flow directly from the private OTN switching domain through their own dedicated set of packet processing functions (queuing, scheduling, coloring, metering, etc.), through their dedicated virtual switch 60 before being steered back to the OTN domain without sharing any packet processing functions with any other user. This high level of separation is important to maintain the private integrity of the EPLAN.

For example, the virtual switches 60 are Ethernet service switches and can use MPLS, Q-in-Q, etc. The virtual switches 60 can have virtual interface (VI) options 2600 which can provide framing choices, etc. The virtual switches 60 can include flow interface (FI) options 2602 such as for Class of Service (CoS), metering, etc. The virtual switches 60 can include logical interface (LI) options such as for VLANs, etc. The virtual switches 60 can include logical ports (LP) 2606 for client link aggregation group (LAG), etc. Finally, the virtual switches 60 can include client physical ports (PP) 2608 which can interface to the OTN service switch 58 at ODUs 2610. The ODUs 2610 can be for add/drop from an OTN layer for packet switching. The ODUs 2610 can include either high-order (HO) ODUs (ODU-H) or low-order (LO) ODUs (ODU-L) 2612 which interface to OTUs 2614. The OTN service switch 58 can include private "through" switched OTN 2616, dedicated low-order ODUs such as for 10 GbE and the like, or multiplexed OTN containers in high-order ODUs.

Figure 27:
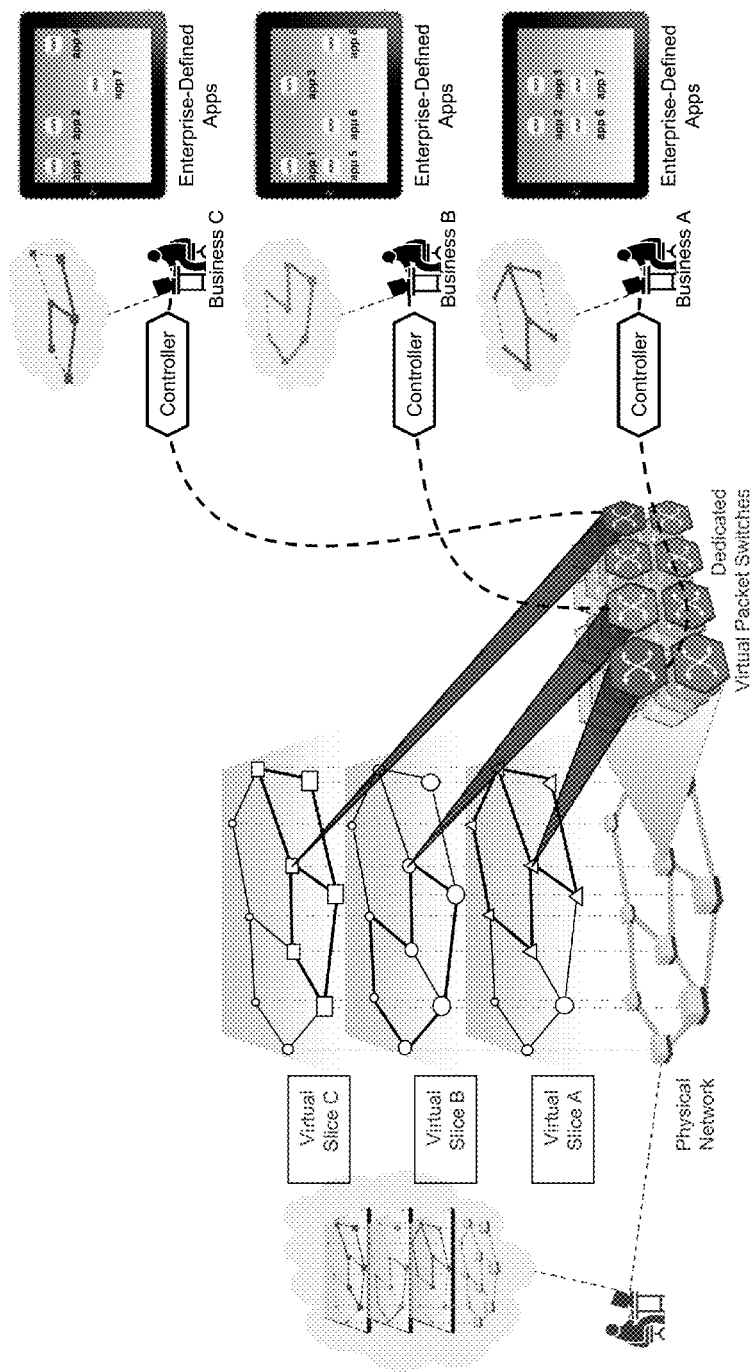
FIG. 27 is a network diagram of SDN-enabled private networks using the EPLANs.

Referring to FIG. 27, in an exemplary embodiment, a network diagram illustrates SDN-enabled private networks using the EPLANs. Multiple parties can participate in the management and control of an EPLAN network. As illustrated in FIG. 27, service providers virtualize their own physical network by partitioning the transmission and switching resources into separate, private packet-optical networking domains. These domains are then sold as service offerings to enterprise client customers or third-party network operators as wholesale services, who then manage their own set of network applications across their dedicated private resources. Because the EPLAN is a transparent service offering, the network management and control responsibilities of the service provider and the enterprise can remain independent of each other.

The service provider's responsibility is to create a private, transparent packet-optical network partition for the enterprise or network operator customer and then manage the stability of that virtual network according to a pre-defined service level agreement (SLA). To achieve this, the service provider takes advantage of a network management and control toolkit to plan the necessary connectivity matrix, provision the corresponding optical virtual private networks (O-VPNs) across the switched OTN infrastructure, and provision the appropriate packet virtual switches and to stitch everything together as a Layer 1/Layer 2 network. Because a service provider's network is typically quite large and complex, distributed control plane automation is used extensively to automate the Layer 1 connectivity between Layer 1 and Layer 2 switching locations. In its simplest configuration, once the service provider has set up a virtual packet-optical network, the enterprise or third-party network operator is provided a set of ports attached to a set of dedicated links connecting together a set of dedicated virtual packet switches. An optional process for how the network of Layer 1 links and Layer 2 virtual switches could be planned is described in FIGS. 22A and 22B. At this point, the service provider may offer a Carrier Ethernet EPLAN service across the network, providing standard IEEE 802.1 bridging functions and a rich set of network OAM monitoring, details of which could be exposed to the enterprise customer as part of the SLA. Alternatively, the service provider may only monitor the health of physical Layer 1 connectivity and the Layer 2 virtual switches, leaving the details of the packet switching function to be managed separately and transparently by the enterprise or third-party network operator.

Many of today's enterprises want a high degree of autonomy and control over their private networks, and they want to be able to code and test networking applications rapidly. Consequently, many enterprises are exhibiting a strong interest in software-defined networking (SDN), with OpenFlow being an example of a popular SDN control interface that promises rapid application deployment and network customization. In the model shown in FIG. 27, the enterprises are provided total control over their private packet switched networks through the use of an SDN controller and interface (OpenFlow is shown). Each enterprise acquires full visibility of its own (abstracted) network topology from the service provider (for example, through a customer management portal) and is provided control over how packets flow through their private virtualized network partition. A service provider may use a FlowVisor, for example, to enable separation of different enterprise control communications, abstraction of network views of each enterprises' virtual network partition and to apply specific management policy to each virtual network slice. Each enterprise is provided the flexibility to program its dedicated network based on its own custom set of network applications.

In this example, the service provider runs an OpenFlow agent on each virtual switch, which communicates with the enterprise's OpenFlow controller (the enterprise controller may also be provided by the service provider). The controllers may be located on a server local to the enterprise, or they may be hosted as a software service in a cloud data center. Because enterprise networks are usually much smaller than service provider networks and much more focused in functionality, the SDN controllers need not be very sophisticated and should not need to scale extensively. Each enterprise has a choice of which network solutions to use, whether they are based on standard distributed packet switching technologies, home-grown applications (apps) or third party beta trials. Because each enterprise is separated from every other network user, one implementation cannot unfairly impact other users through the deployment of badly behaved applications.

Although the present invention has been illustrated and described herein with reference to preferred embodiments and specific examples thereof, it will be readily apparent to those of ordinary skill in the art that other embodiments and examples may perform similar functions and/or achieve like results. In the foregoing description of the hybrid packet-optical private network systems and methods, reference has been made to Layer 1, Layer 2, EPLAN, and the like. It will be apparent to those of ordinary skill in the art that Layer 1 may include optical wavelengths, SONET/SDH bandwidth, OTN bandwidth, and the like. Also, it will be apparent to those of ordinary skill in the art that Layer 2 may generally refer to packets including Ethernet, MPLS, VPLS, pseudowires, and the like. Furthermore, while reference is made to Layer 2 switching, etc., it will be apparent to those of ordinary skill in the art that the systems and methods described herein may also extend to Layer 3 and above private networks. That is, reference is presented herein to Ethernet/Layer 2 and OTN/Layer 1 for illustration purposes only, and those of ordinary skill will appreciate the hybrid packet-optical private network systems and methods may be extended in other combinations to support private, dedicated, guaranteed, etc. connectivity over a multi-point infrastructure. All such equivalent embodiments and examples are within the spirit and scope of the present invention and are intended to be covered by the following claims.

What is claimed is:

1. A data center network, comprising:
   a plurality of packet-optical switches each at a location in the data center network and each comprising a switch fabric comprising both a Layer 1 fabric and a packet fabric communicatively coupled to one or more line ports;
   wherein the plurality of packet-optical switches are communicatively coupled to one another in a topology to form data connectivity in the data center network, and
   wherein each of the plurality of packet-optical switches is configured to
      provide the data connectivity through the Layer 1 switch bypassing the packet fabric when the location does not require Layer 2 forwarding in the topology, and
      provide the data connectivity through the Layer 1 switch and using the packet fabric to provide the data service with multi-point connectivity when the location requires Layer 2 forwarding in the topology.

2. The data center network of claim 1, further comprising:
a plurality of servers at the locations interconnected to one another via the data connectivity, wherein the data center network comprises a distributed data center.

3. The data center network of claim 2, wherein the plurality of servers are interconnected to one another to form the distributed data center using one or more of Multiprotocol Label Switching (MPLS) and Internet Protocol (IP).

4. The data center network of claim 1, wherein at least one location comprises a content source which performs content distribution over the data connectivity.

5. The data center network of claim 4, wherein the content distribution uses Ethernet multicast within dedicated Ethernet private trees over the data connectivity.

6. The data center network of claim 1, wherein the topology comprises a mesh of different data centers together to form a distributed data center.

7. The data center network of claim 1, wherein the packet fabric utilizes a software-defined virtual switch using Software Defined Networking (SDN).

8. A packet-optical switch at a location in a data center network having a topology, the packet-optical switch comprising:
one or more line ports; and
a switch fabric comprising both a Layer 1 fabric and a packet fabric communicatively coupled to the one or more line ports,
wherein the one or more line ports are communicatively coupled to other locations in the topology to form data connectivity in the data center network, and
wherein the packet-optical switch is configured to
provide the data connectivity through the Layer 1 switch bypassing the packet fabric when the location does not require Layer 2 forwarding in the topology, and
provide the data connectivity through the Layer 1 switch and using the packet fabric to provide the data service in multi-point connectivity when the location requires Layer 2 forwarding in the topology.

9. The packet-optical switch of claim 8, wherein one or more servers at the location are interconnected to other servers via the data connectivity, wherein the data center network comprises a distributed data center.

10. The packet-optical switch of claim 9, wherein the one or more servers and the other servers are interconnected to one another to form the distributed data center using one or more of Multiprotocol Label Switching (MPLS) and Internet Protocol (IP).

11. The packet-optical switch of claim 8, wherein the location comprises a content source which performs content distribution over the data connectivity.

12. The packet-optical switch of claim 11, wherein the content distribution uses Ethernet multicast within dedicated Ethernet private trees over the data connectivity.

13. The packet-optical switch of claim 8, wherein the topology comprises a mesh of different data centers together to form a distributed data center.

14. The packet-optical switch of claim 8, wherein the packet fabric utilizes a software-defined virtual switch using Software Defined Networking (SDN).

15. A method of operation a packet-optical switch at a location in a data center network having a topology, the method comprising:
at the packet-optical switch comprising a switch fabric comprising both a Layer 1 fabric and a packet fabric communicatively coupled to one or more line ports to provide data connectivity in the data center network,
providing the data connectivity through the Layer 1 switch bypassing the packet fabric when the location does not require Layer 2 forwarding in the topology, and
providing the data connectivity through the Layer 1 switch and using the packet fabric to provide the data service in multi-point connectivity when the location requires Layer 2 forwarding in the topology.

16. The method of claim 15, further comprising:
interconnecting one or more plurality of servers at the location other servers via the data connectivity, wherein the data center network comprises a distributed data center.

17. The method of claim 16, wherein the one or more servers and the other servers are interconnected to one another to form the distributed data center using one or more of Multiprotocol Label Switching (MPLS) and Internet Protocol (IP).

18. The method of claim 15, wherein the location comprises a content source which performs content distribution over the data connectivity.

19. The method of claim 18, wherein the content distribution uses Ethernet multicast within dedicated Ethernet private trees over the data connectivity.

20. The method of claim 15, wherein the topology comprises a mesh of different data centers together to form a distributed data center.

* * * * *